US009485739B2

(12) United States Patent
Shikama

(10) Patent No.: US 9,485,739 B2
(45) Date of Patent: Nov. 1, 2016

(54) INTERFERENCE CONTROL METHOD, INTERFERENCE CONTROL APPARATUS, AND WIRELESS COMMUNICATION SYSTEM

(71) Applicant: FUJITSU LIMITED, Kawasaki-shi, Kanagawa (JP)

(72) Inventor: Takao Shikama, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 14/320,221

(22) Filed: Jun. 30, 2014

(65) Prior Publication Data

US 2015/0009839 A1 Jan. 8, 2015

(30) Foreign Application Priority Data

Jul. 2, 2013 (JP) .................................. 2013-139104

(51) Int. Cl.
*H04J 1/16* (2006.01)
*H04W 52/24* (2009.01)
*H04W 52/22* (2009.01)
*H04B 17/373* (2015.01)

(52) U.S. Cl.
CPC ......... *H04W 52/243* (2013.01); *H04B 17/373* (2015.01); *H04W 52/223* (2013.01)

(58) Field of Classification Search
CPC ........... H04W 52/00; H04W 52/0229; H04W 52/0245; H04W 52/241; H04W 52/243; H04W 52/245; H04W 52/223; H04L 5/0073; H04B 17/373
See application file for complete search history.

(56) References Cited

U.S. PATENT DOCUMENTS

| 2007/0142067 | A1* | 6/2007 | Cheng | ................... | H04L 5/0007 455/512 |
| 2011/0032857 | A1* | 2/2011 | Umeuchi | .............. | H04W 48/20 370/311 |
| 2014/0256335 | A1* | 9/2014 | Kobayashi | ............ | H04W 16/22 455/450 |
| 2015/0072692 | A1* | 3/2015 | Seki | .................. | H04W 52/0206 455/437 |

FOREIGN PATENT DOCUMENTS

| JP | 2004-64538 A | 2/2004 |
| JP | 2004-363940 A | 12/2004 |

* cited by examiner

*Primary Examiner* — Kan Yuen
(74) *Attorney, Agent, or Firm* — Arent Fox LLP

(57) ABSTRACT

An interference control method including: receiving actual reception qualities of wireless signals that are measured by a wireless terminal, each of the wireless signals being sent from each of base stations, estimating future reception qualities after a specified period based on the actual reception qualities, estimating, for each of combinations of transmission powers of the base stations, corresponding interference based on the future reception qualities, and setting each of transmission powers of the base stations based on one of the combinations of transmission powers that is selected based on the corresponding interference.

13 Claims, 34 Drawing Sheets

FIG. 1C

| TIME | MEASUREMENT RESULT OF RECEPTION QUALITY | |
|---|---|---|
| | FIRST WIRELESS BASE STATION | SECOND WIRELESS BASE STATION |
| t1 | q11 | q21 |
| t2 | q12 | q22 |

| TIME | ESTIMATED VALUE OF RECEPTION QUALITY | |
|---|---|---|
| | FIRST WIRELESS BASE STATION | SECOND WIRELESS BASE STATION |
| t3 | q13 | q23 |

150

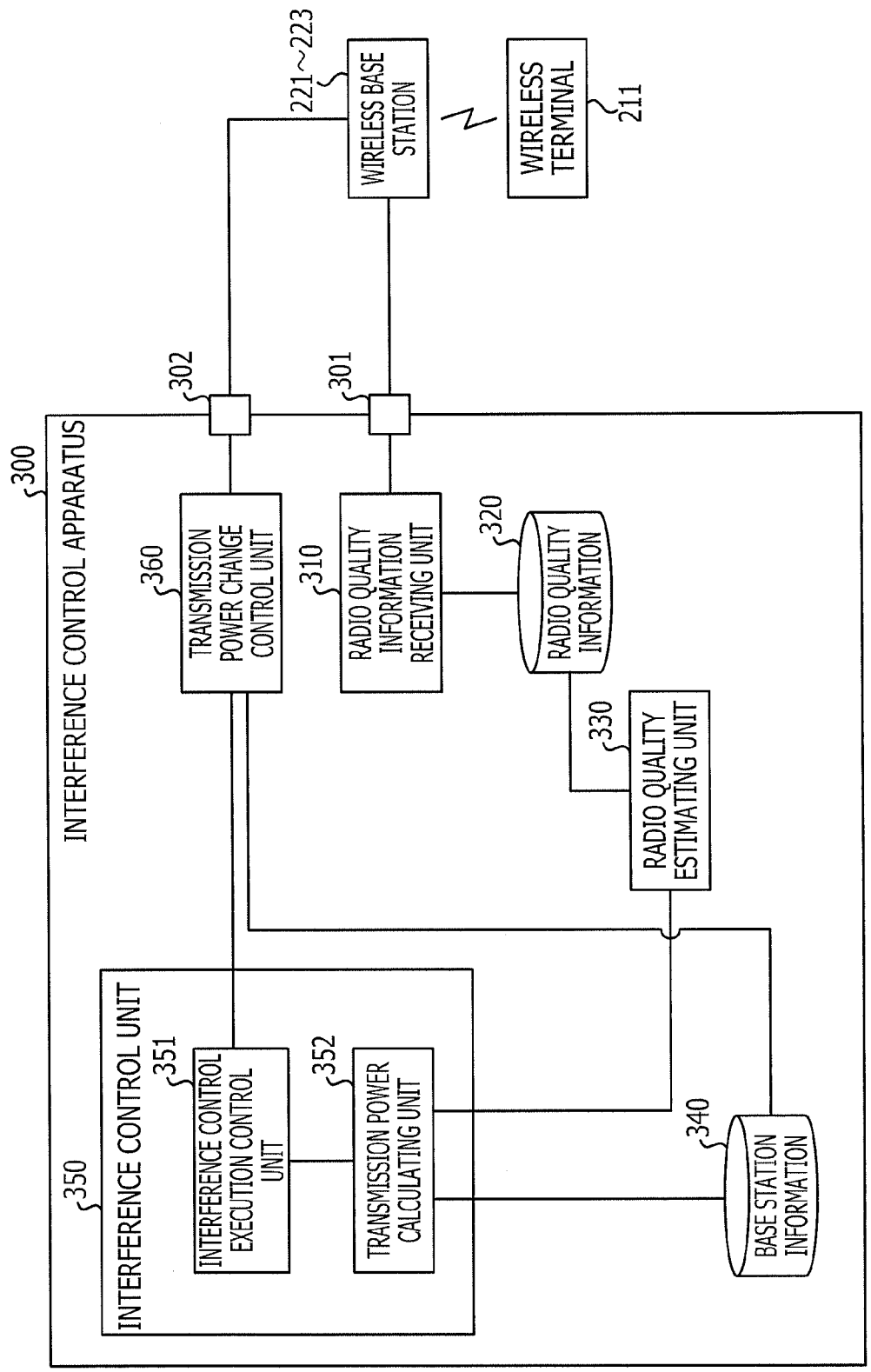

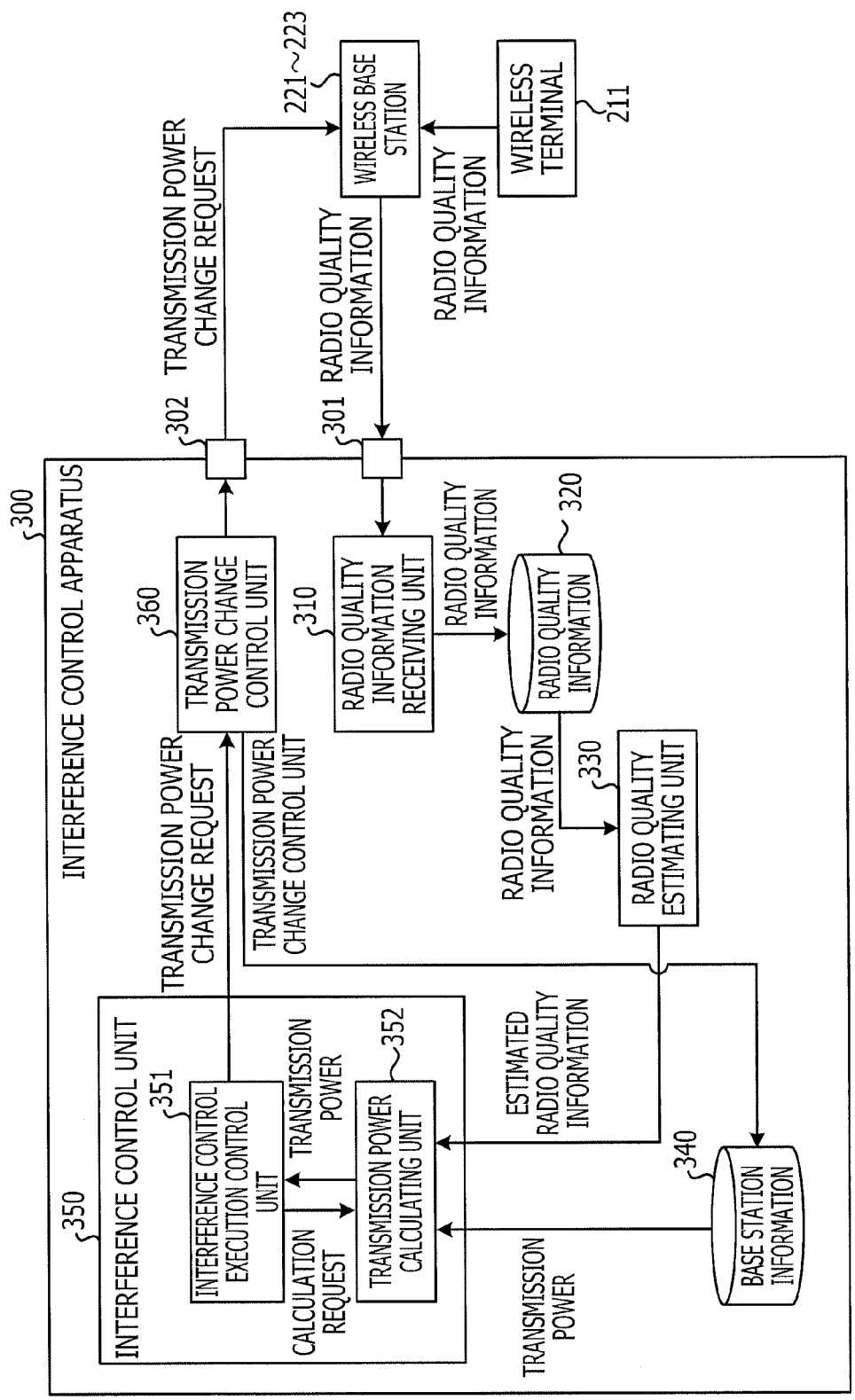

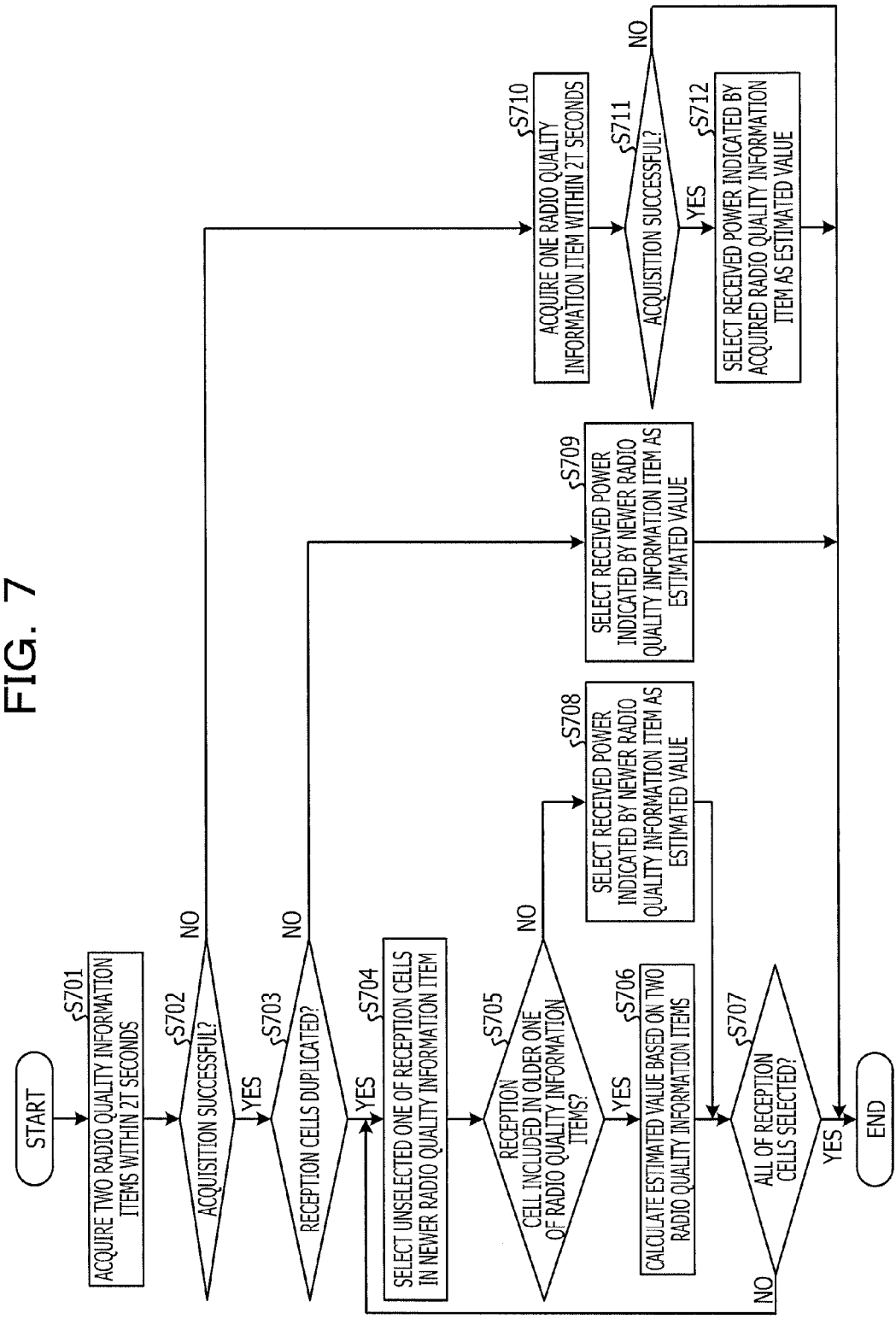

FIG. 8B

| TIME INFORMATION | TERMINAL ID | RECEPTION POWER [dBm] | | | | CELL TO CONNECT TO | SNR [dB] |
|---|---|---|---|---|---|---|---|
| | | CELL ID: A1 | CELL ID: A2 | CELL ID: A3 | CELL ID: A4 | | |
| 1 | AAA | −76.07 | −89.99 | −84.08 | −91.45 | A1 | 6.43 |
| 11 | AAA | −81.04 | −89.78 | −81.04 | −89.78 | A1 | −1.03 |
| 21 | AAA | −84.80 | −89.99 | −76.07 | −87.99 | A3 | 6.22 |
| 31 | AAA | −87.68 | −90.58 | −72.30 | −86.23 | A3 | 10.74 |
| 41 | AAA | −89.99 | −91.45 | −76.07 | −84.80 | A3 | 6.91 |

820

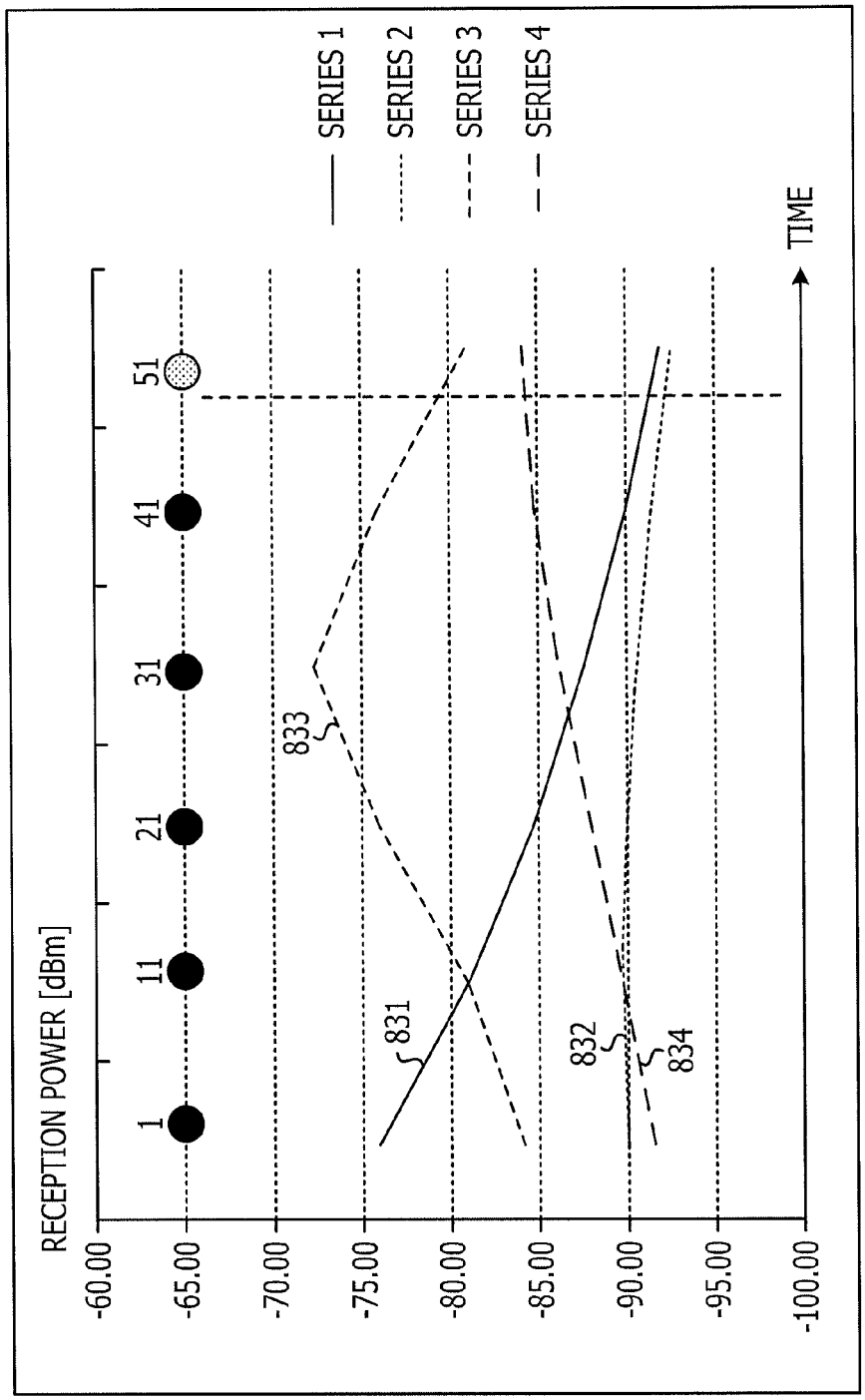

FIG. 8D

| TIME INFORMATION | TERMINAL ID | RECEPTION POWER [dBm] | | | | CELL TO CONNECT TO | SNR [dB] | |
|---|---|---|---|---|---|---|---|---|
| | | CELL ID: A1 | CELL ID: A2 | CELL ID: A3 | CELL ID: A4 | | | |
| 51 | AAA | −89.99 | −91.45 | −76.07 | −84.80 | A3 | 6.91 | ~841 |
| 51 | AAA | −92.30 | −92.32 | −79.84 | −83.37 | A3 | 2.54 | ~842 |

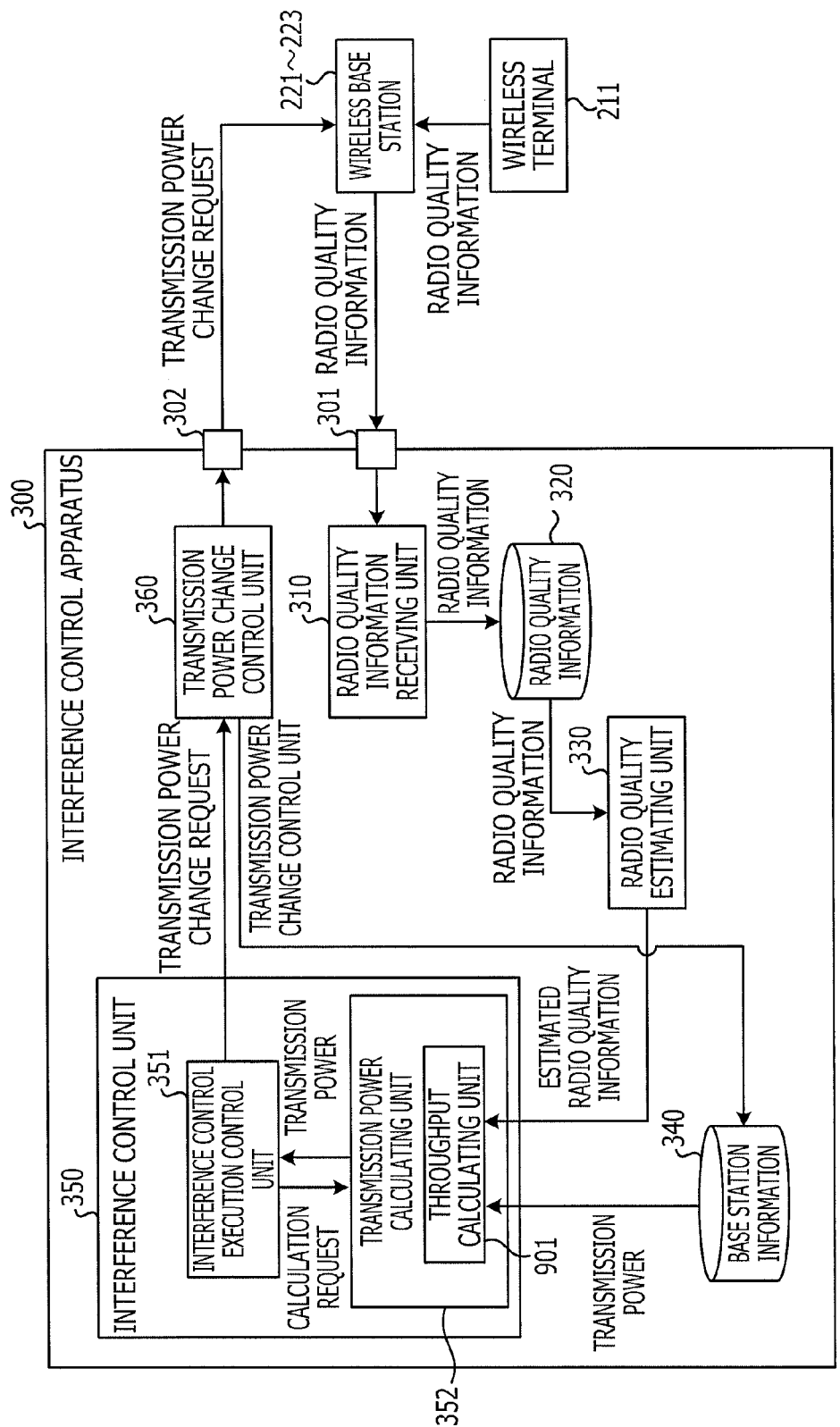

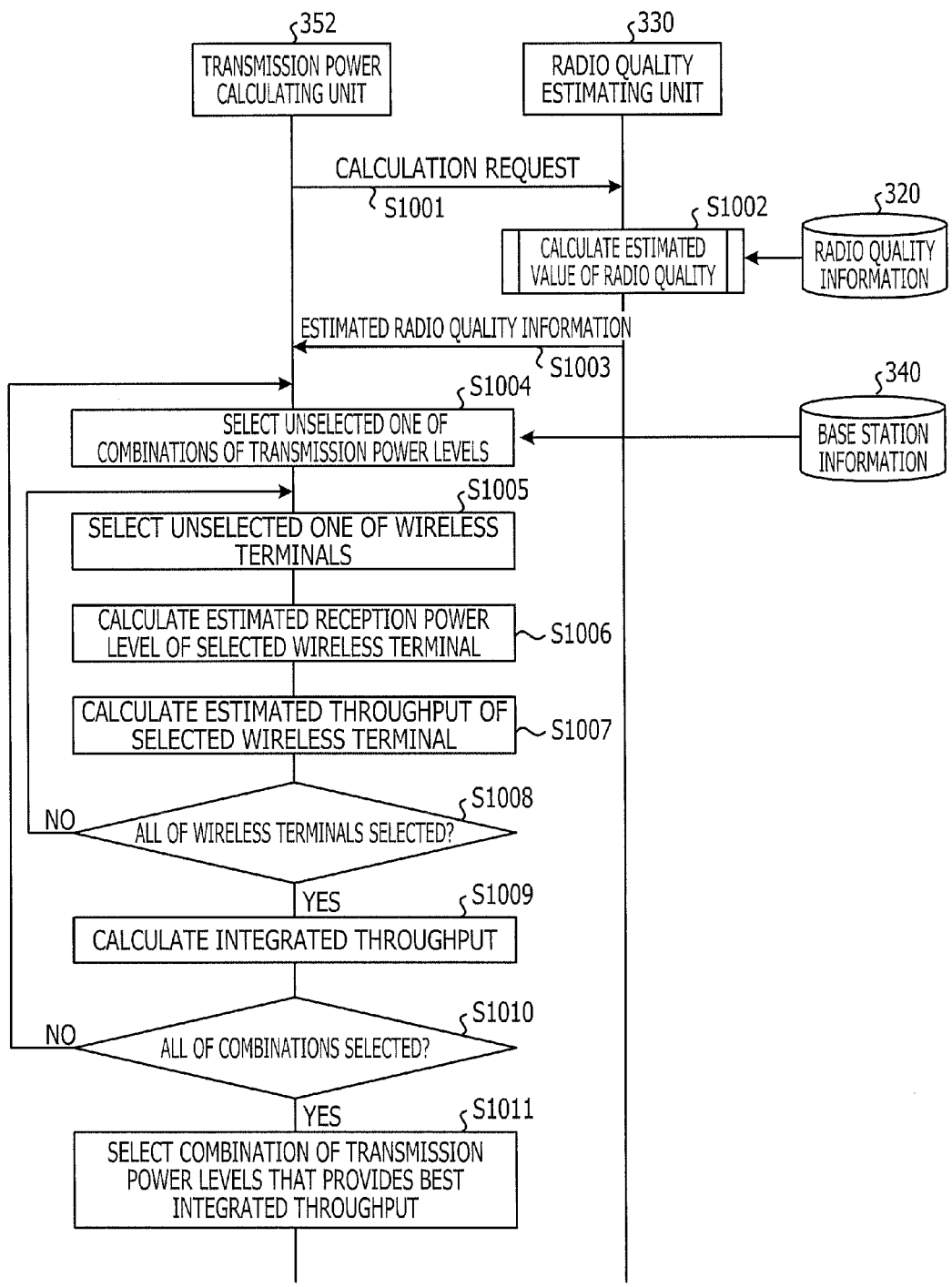

FIG. 11

| SNR[dB] | SNR (ANTILOG) | BIT RATE [Mbps] |
|---|---|---|
| −10 | 0.1 | 1.4 |
| −9 | 0.1 | 1.7 |
| −8 | 0.2 | 2.1 |
| −7 | 0.2 | 2.6 |
| −6 | 0.3 | 3.2 |
| −5 | 0.3 | 4.0 |
| −4 | 0.4 | 4.8 |
| −3 | 0.5 | 5.9 |
| −2 | 0.6 | 7.1 |
| −1 | 0.8 | 8.4 |
| 0 | 1.0 | 10.0 |
| 1 | 1.3 | 11.8 |
| 2 | 1.6 | 13.7 |
| 3 | 2.0 | 15.8 |
| 4 | 2.5 | 18.1 |
| 5 | 3.2 | 20.6 |
| 6 | 4.0 | 23.2 |
| 7 | 5.0 | 25.9 |
| 8 | 6.3 | 28.7 |
| 9 | 7.9 | 31.6 |
| 10 | 10.0 | 34.6 |
| 11 | 12.6 | 37.6 |
| 12 | 15.8 | 40.7 |
| 13 | 20.0 | 43.9 |
| 14 | 25.1 | 47.1 |
| 15 | 31.6 | 50.3 |
| 16 | 39.8 | 53.5 |
| 17 | 50.1 | 56.8 |
| 18 | 63.1 | 60.0 |
| 19 | 79.4 | 63.3 |
| 20 | 100.0 | 66.6 |
| 21 | 125.9 | 69.9 |
| 22 | 158.5 | 73.2 |
| 23 | 199.5 | 76.5 |

| TIME INFORMATION | TERMINAL ID | RECEPTION POWER [dBm] | | | | | | | | CELL TO CONNECT TO |
|---|---|---|---|---|---|---|---|---|---|---|
| | | CELL ID: A1 | CELL ID: A2 | CELL ID: A3 | CELL ID: A4 | CELL ID: B1 | CELL ID: B2 | CELL ID: B3 | CELL ID: B4 | |
| 1 | AAA | -76.07 | -89.99 | -84.08 | -91.45 | D.C | D.C | D.C | D.C | A1 |
| 11 | AAA | -81.04 | -89.78 | -81.04 | -89.78 | -92.97 | -94.96 | D.C | D.C | A1 |
| 21 | AAA | -84.80 | -89.99 | -76.07 | -87.99 | -84.80 | -93.54 | D.C | D.C | A3 |
| 31 | AAA | -87.68 | -90.58 | -72.30 | -86.23 | -87.68 | -91.91 | D.C | D.C | A3 |
| 41 | AAA | -89.99 | -91.45 | -76.07 | -84.80 | -89.99 | -89.99 | D.C | D.C | A3 |
| 51 | AAA | -91.91 | -92.46 | -81.04 | -84.23 | -87.68 | -87.68 | D.C | D.C | A3 |
| 61 | AAA | -93.54 | -93.54 | -84.40 | -84.80 | -89.99 | -84.80 | D.C | -93.54 | A3 |

1522

| TIME INFORMATION | TERMINAL ID | RECEPTION POWER [dBm] | | | | | | | | CELL TO CONNECT TO |
|---|---|---|---|---|---|---|---|---|---|---|
| | | CELL ID: A1 | CELL ID: A2 | CELL ID: A3 | CELL ID: A4 | CELL ID: B1 | CELL ID: B2 | CELL ID: B3 | CELL ID: B4 | |
| 71 | AAA | -95.17 | -94.62 | -87.76 | -85.37 | -83.37 | -81.92 | -93.54 | -93.54 | B1 |

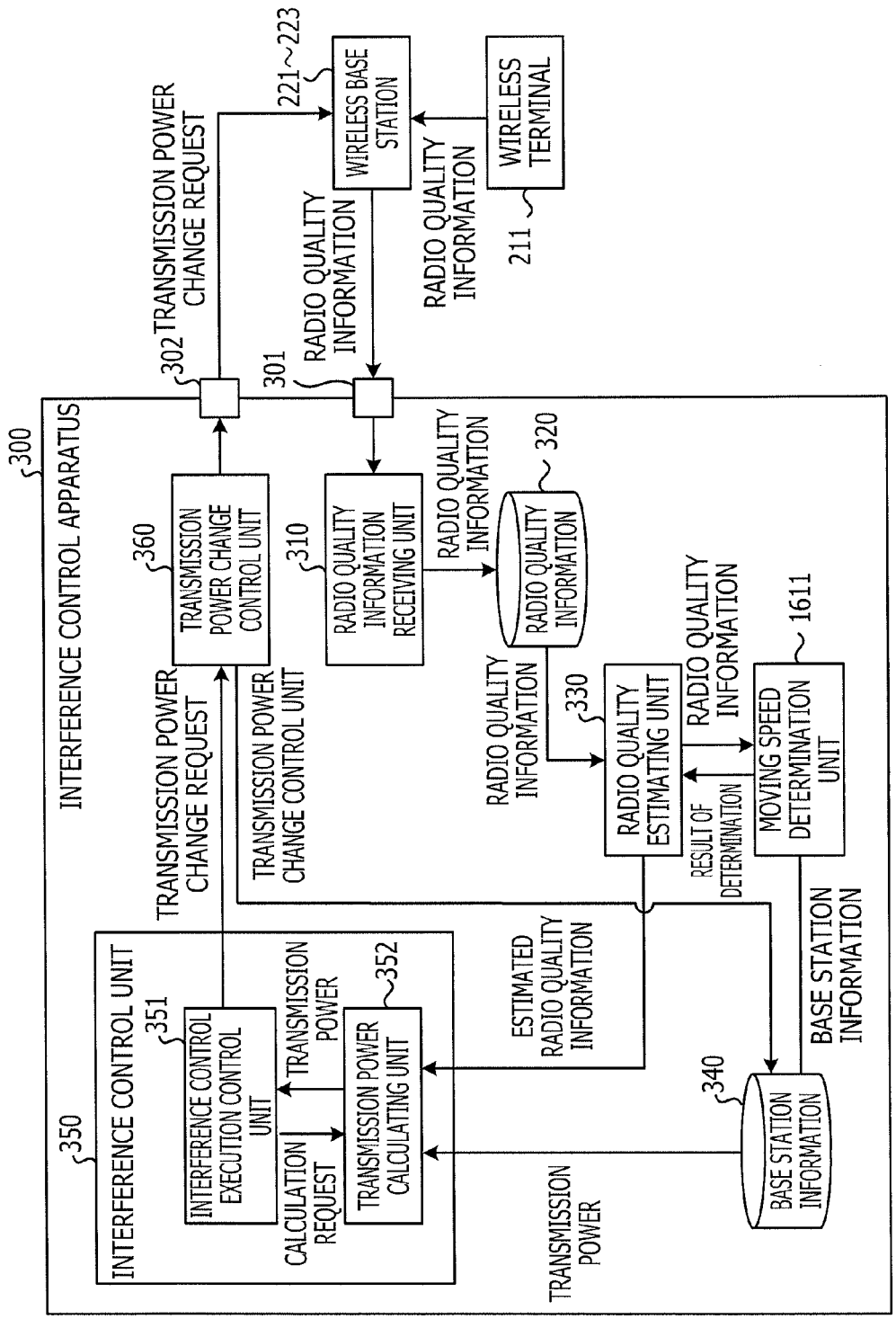

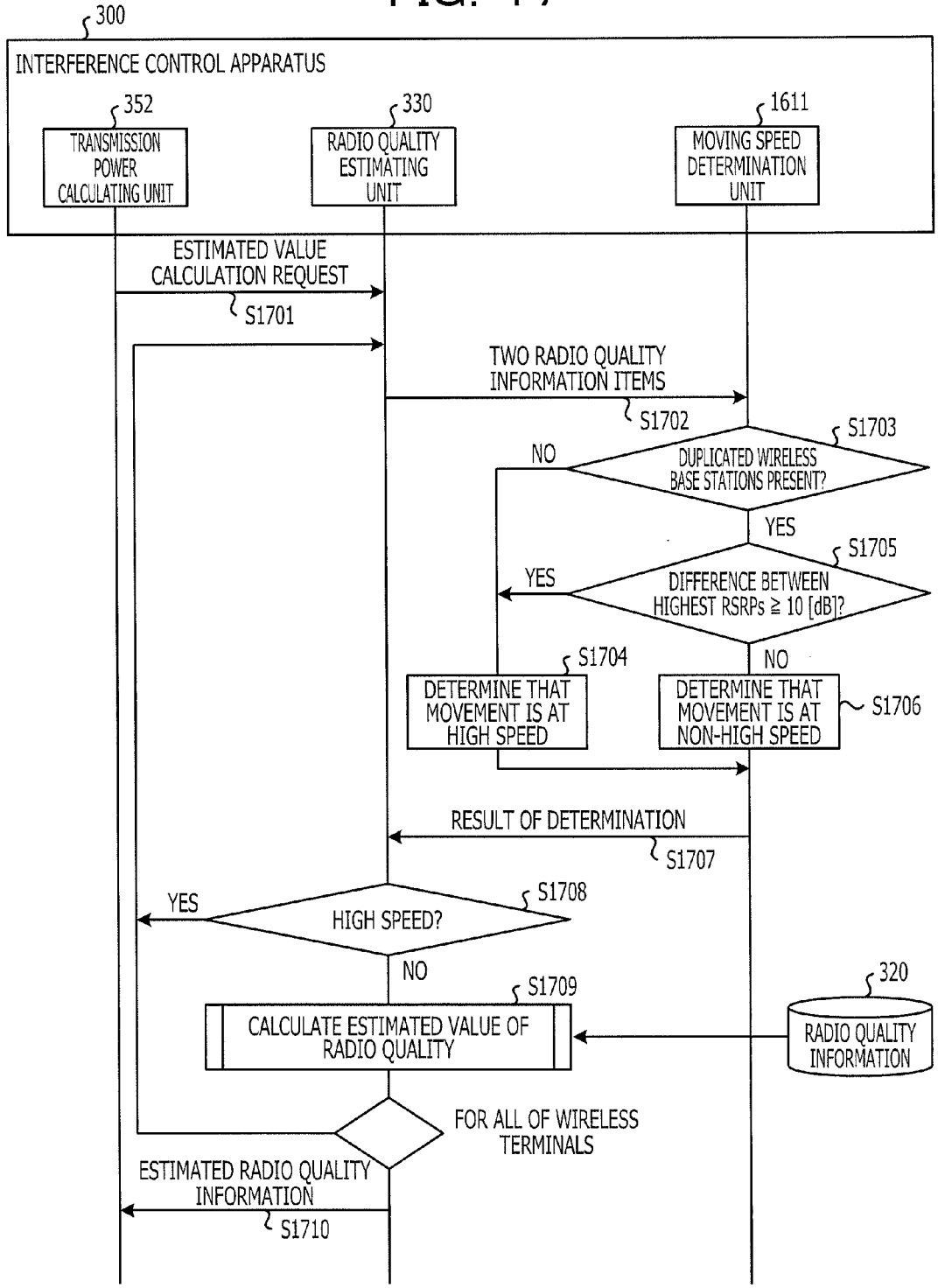

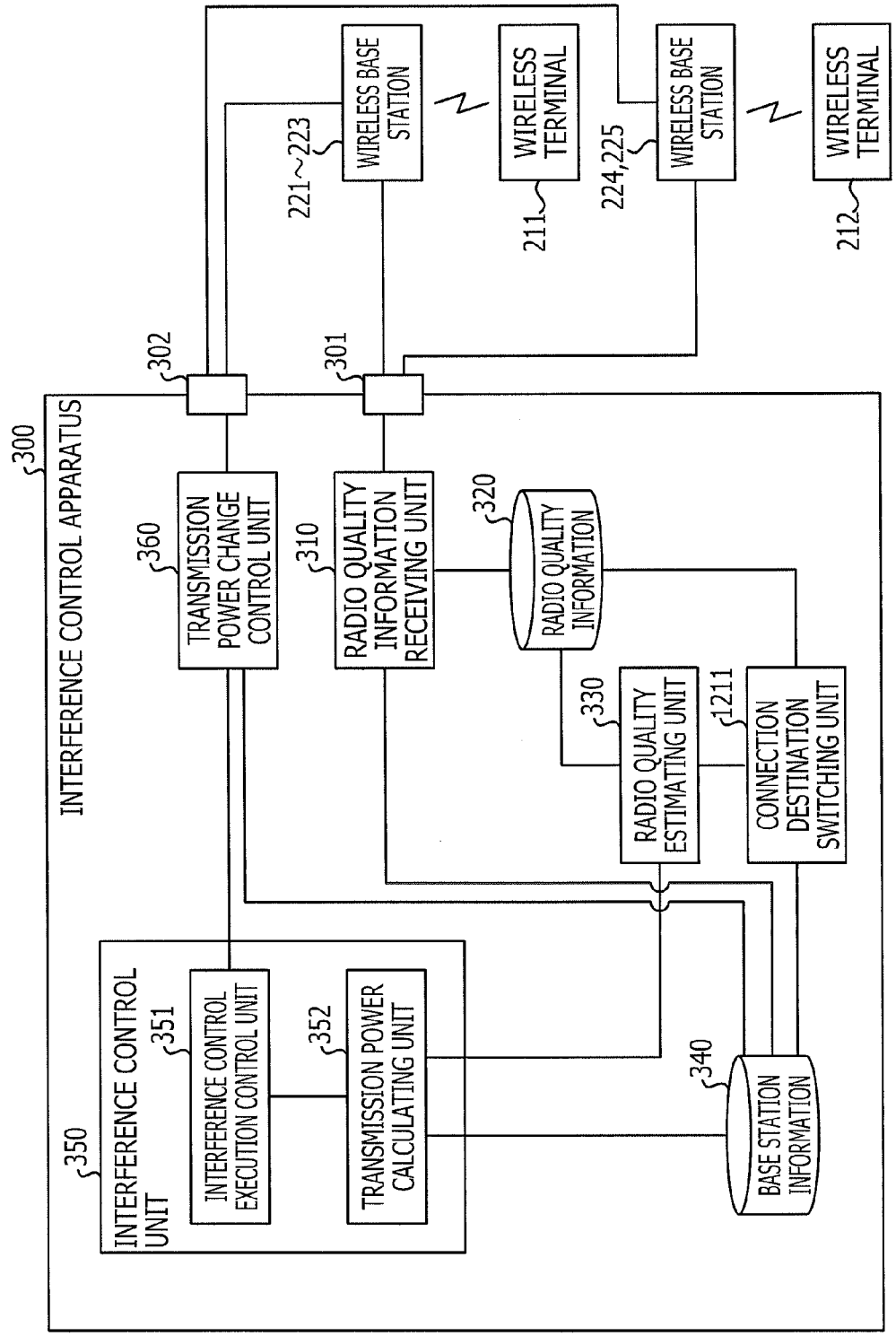

INTERFERENCE CONTROL METHOD, INTERFERENCE CONTROL APPARATUS, AND WIRELESS COMMUNICATION SYSTEM

CROSS-REFERENCE TO RELATED APPLICATION

This application is based upon and claims the benefit of priority of the prior Japanese Patent Application No. 2013-139104 filed on Jul. 2, 2013, the entire contents of which are incorporated herein by reference.

FIELD

The embodiments discussed herein are related to an interference control method, an interference control apparatus, and a wireless communication system.

BACKGROUND

A technology for controlling the communication environment of a wireless terminal by controlling radio waves transmitted from a wireless base station in a mobile wireless network using 3rd generation (3G) mobile communication system or long term evolution (LTE) mobile communication system has been developed (refer to, for example, Japanese Laid-open Patent Publication No. 2004-363940). In addition, a technology for estimating the move destination of a mobile terminal based on the position information sent from the wireless terminal and controlling a data rate based on the communication quality at an estimated location has been developed (refer to, for example, Japanese Laid-open Patent Publication No. 2004-064538).

SUMMARY

According to an aspect of the invention, an interference control method includes receiving actual reception qualities of wireless signals that are measured by a wireless terminal, each of the wireless signals being sent from each of base stations, estimating future reception qualities after a specified period based on the actual reception qualities, estimating, for each of combinations of transmission powers of the base stations, corresponding interference based on the future reception qualities, and setting each of transmission powers of the base stations based on one of the combinations of transmission powers that is selected based on the corresponding interference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1C illustrates an example of the measurement result of reception quality;

FIG. 1D illustrates an example of the estimated value of the reception quality;

FIG. 3A illustrates an example of an interference control apparatus according to the second exemplary embodiment;

FIG. 3B illustrates an example of the flow of signals in the interference control apparatus illustrated in FIG. 3A;

FIG. 7 is a flowchart of an example of a calculation process of the estimated value of the radio quality;

FIG. 8B illustrates an example of a radio quality information table;

FIG. 8C is a graph illustrating an example of a change in the received power in each of cells;

FIG. 8D illustrates an example of the actual measurement value and the estimated value;

FIG. 9B illustrates an example of the flow of signals in the interference control apparatus illustrated in FIG. 9A;

FIG. 10 is a sequence diagram illustrating an example of calculation of the transmission power level according to the third exemplary embodiment;

FIG. 11 illustrates an example of the result of calculation of the estimated throughput;

FIG. 15B illustrates an example of a radio quality information table according to the fourth exemplary embodiment;

FIG. 16B illustrates an example of the flow of signals in the interference control apparatus illustrated in FIG. 16A;

FIG. 17 is a sequence diagram illustrating an example of the processing performed by the interference control apparatus according to the fifth exemplary embodiment;

FIG. 20A illustrates an example of an interference control apparatus according to a seventh exemplary embodiment;

DESCRIPTION OF EMBODIMENTS

An interference control method, an interference control apparatus, and a wireless communication system according to an exemplary embodiment of the present disclosure are described in detail below.

According to the above-described existing technologies, since it takes time to calculate the transmission power of a wireless base station and switch between wireless base stations in the interference control, it is difficult to avoid radio interference if the reception environment of a wireless terminal is changed in accordance with movement of the wireless terminal.

According to an aspect of the present disclosure, an interference control method, an interference control apparatus, and a wireless communication system capable of avoiding radio interference are provided.

First Exemplary Embodiment

Wireless Communication System According to First Exemplary Embodiment

Figure 1A:
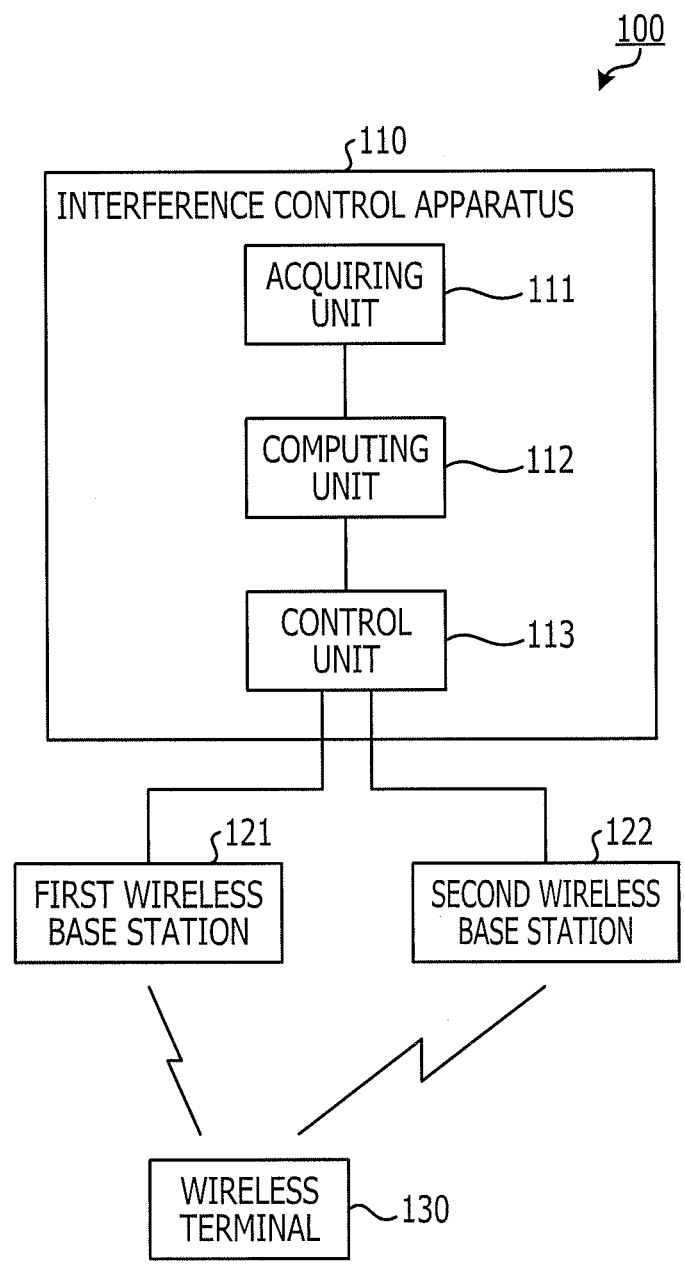
FIG. 1A illustrates a wireless communication system according to a first exemplary embodiment.
Figure 1B:
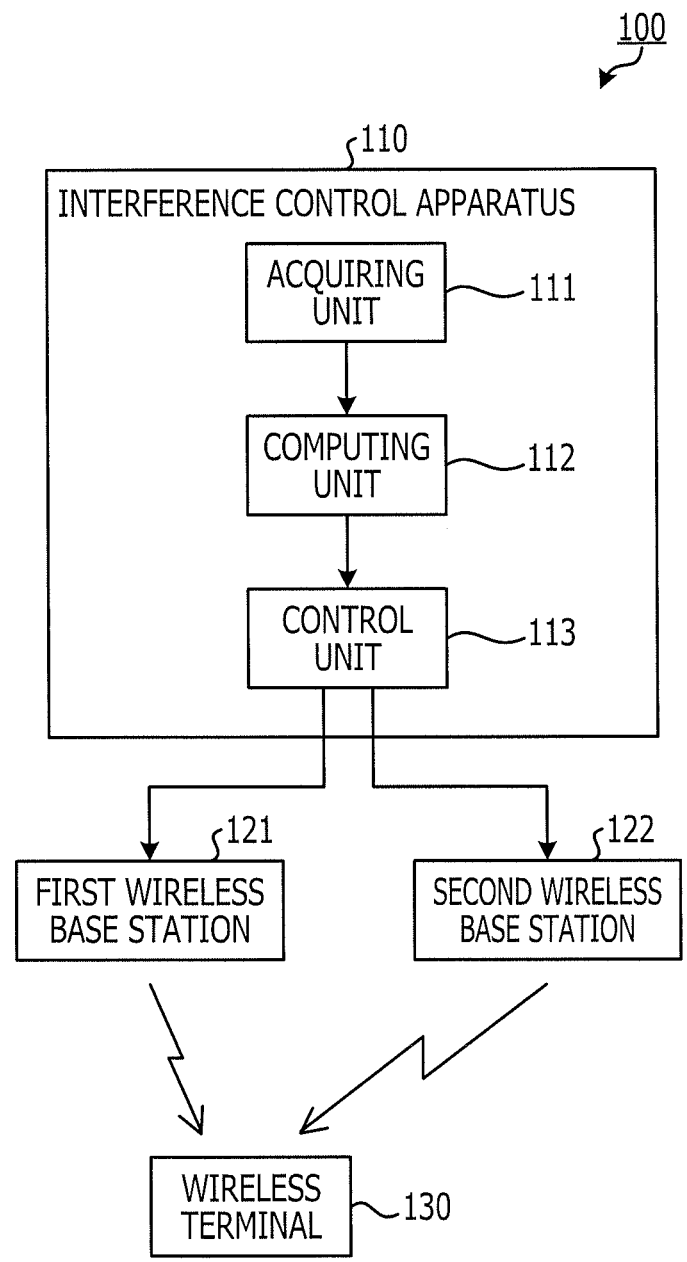
FIG. 1B illustrates an example of the flow of signals in the wireless communication system illustrated in FIG. 1A.

FIG. 1A illustrates a wireless communication system according to a first exemplary embodiment. FIG. 1B illustrates an example of the flow of signals in the wireless communication system illustrated in FIG. 1A. As illustrated in FIGS. 1A and 1B, a wireless communication system 100 according to the first exemplary embodiment includes an interference control apparatus 110, a first wireless base station 121, a second wireless base station 122, and a wireless terminal 130.

For example, the first wireless base station 121 and the second wireless base station 122 form cells that partially overlap each other. The wireless terminal 130 is located in the overlapped portion of the cells of the first wireless base station 121 and the second wireless base station 122 and is capable of wirelessly communicating with the first wireless base station 121 and the second wireless base station 122. The number of the wireless terminal 130 may be plural.

By controlling the transmission power of the first wireless base station 121 and the transmission power of the second wireless base station 122, the interference control apparatus 110 controls interference in the wireless terminal 130. For example, the interference control apparatus 110 is an apparatus capable of communicating with the first wireless base station 121 and the second wireless base station 122. Alternatively, for example, the interference control apparatus 110 may be an apparatus installed in one of the first wireless base station 121 and the second wireless base station 122 capable of communicating with the other. Hereinafter, the description is made with reference to the interference control apparatus 110 capable of communicating with both the first wireless base station 121 and second wireless base station 122.

The wireless terminal 130 measures the reception quality of a wireless signal received from the first wireless base station 121 by the wireless terminal 130. In addition, the wireless terminal 130 measures the reception quality of a wireless signal received from the second wireless base station 122 by the wireless terminal 130. An example of the reception quality is a received signal strength.

For example, the wireless terminal 130 sends the measurement results of the reception quality to one of the first wireless base station 121 and the second wireless base station 122 to which the wireless terminal 130 is currently connected. In addition, the wireless terminal 130 measures the reception quality at different points in time and sends the measurement results. One of the first wireless base station 121 and the second wireless base station 122 that has received the measurement result from the wireless terminal 130 sends the received measurement results to the interference control apparatus 110.

The interference control apparatus 110 includes an acquiring unit 111, a computing unit 112, and a control unit 113. The acquiring unit 111 receives the measurement results of the reception quality of wireless signals that are sent from each of the first wireless base station 121 and the second wireless base station 122 and that are received by the wireless terminal 130 at different points in time.

For example, the acquiring unit 111 receives the measurement results sent from the first wireless base station 121 or the second wireless base station 122 and accumulates the received measurement results in a memory of the interference control apparatus 110. In this manner, the acquiring unit 111 may receive the measurement results at different points in time. The acquiring unit 111 outputs the acquired measurement results to the computing unit 112.

The computing unit 112 calculates the future estimated value of the reception quality of a wireless signal that is sent from each of the first wireless base station 121 and the second wireless base station 122 and that is received by the wireless terminal 130 based on the measurement results output from the acquiring unit 111. Thereafter, the computing unit 112 outputs the estimated values of the reception quality to the control unit 113.

The control unit 113 controls the transmission power levels of the first wireless base station 121 and the second wireless base station 122 for sending wireless signals based on the estimated values of the reception quality output from the computing unit 112. For example, the control unit 113 controls relative transmission power levels of the first wireless base station 121 and the second wireless base station 122 by sending control signals to the first wireless base station 121 and the second wireless base station 122.

Measurement Result of Reception Quality

FIG. 1C illustrates an example of the measurement result of the reception quality. A measurement result 140 illustrated in FIG. 1C is acquired by the acquiring unit 111. The measurement result 140 indicates the values of reception quality at times t1 and t2 (t1<t2). For example, the measurement results of the reception quality of a wireless signal sent from the first wireless base station 121 and received by the wireless terminal 130 at the times t1 and t2 are denoted by "q11" and "q12", respectively. The measurement results of the reception quality of a wireless signal sent from the second wireless base station 122 and received by the wireless terminal 130 at the times t1 and t2 are denoted by "q21" and "q22", respectively.

Estimated Value of Reception Quality

FIG. 1D illustrates an example of the estimated value of the reception quality. The estimated values of the reception quality at a future time t3 (>t1, t2) are denoted as "q13" and "q23" in the estimated values 150 illustrated in FIG. 1D. For example, q13 indicates the estimated value of the reception quality of a wireless signal sent from the first wireless base station 121 and received by the wireless terminal 130 at the time t3. In addition, q23 indicates the estimated value of the reception quality of a wireless signal sent from the second wireless base station 122 and received by the wireless terminal 130 at the time t3.

For example, the computing unit 112 may calculate q13 based on q11 and q12 of the measurement result 140 illustrated in FIG. 1C. In addition, the computing unit 112 may calculate q23 based on q21 and q22 of the measurement result 140 illustrated in FIG. 1C.

The control unit 113 controls the transmission power levels of the first wireless base station 121 and the second wireless base station 122 based on q13 and q23.

In this manner, according to the interference control apparatus 110 of the first exemplary embodiment, the received signal strength of the wireless terminal 130 at a future time may be estimated from the accumulated reception quality levels of the wireless terminal 130, and the transmission power levels of the first wireless base station 121 and the second wireless base station 122 may be controlled using the result of estimation. In this manner, even when the wireless terminal 130 moves so that the reception environment of the wireless terminal 130 changes, the interference may be appropriately controlled.

Control of Transmission Power Level Based on Estimated Degree of Interference

For example, the acquiring unit 111 acquires the measurement result of reception quality for each of a plurality of the wireless terminals 130. In addition, the computing unit 112 calculates the estimated value of the reception quality for each of the wireless terminals 130. Furthermore, the control unit 113 calculates the estimated value of the degree of interference of each of the wireless terminals 130 for each of combinations of the transmission power levels of the first wireless base station 121 and the second wireless base station 122. Thereafter, the control unit 113 controls the transmission power levels of the first wireless base station 121 and the second wireless base station 122 for sending wireless signals based on the calculated estimated values of the degree of interference.

For example, when the wireless terminal 130 is connected to the first wireless base station 121, the estimated value of the received signal strength of a wireless signal sent from the first wireless base station 121 may be corrected in accordance with an amount of change in the transmission power level of the first wireless base station 121, and the corrected value may be defined as an interfered intensity. In addition, the estimated value of the received signal strength of a wireless signal sent from the second wireless base station 122 may be corrected in accordance with an amount of change in the transmission power level of the second wireless base station 122, and the corrected value may be defined as an interfering intensity. Then, the control unit 113 may calculate the estimated value of the degree of interference as, for example, interfering intensity/interfered intensity.

Control Based on Estimated Value of Throughput

The control unit 113 may calculate the estimated value of the throughput of each of the wireless terminals 130 based on the calculated estimated value of the degree of interference of the wireless terminal 130. Thereafter, the control unit 113 controls the transmission power level of each of the first wireless base station 121 and the second wireless base station 122 for sending a wireless signal.

For example, the case in which the wireless terminal 130 is connected to the first wireless base station 121 is discussed. In such a case, the control unit 113 corrects the maximum bandwidth of wireless communication between the wireless terminal 130 and the first wireless base station 121 using the estimated value of the degree of interference calculated for the wireless terminal 130. In this manner, the estimated value of throughput of the wireless terminal 130 may be calculated.

In addition, the control unit 113 may correct the calculated estimated value of throughput using the number of terminals connected to the first wireless base station 121 to which the wireless terminal 130 is connected. In this manner, the estimated value of throughput in accordance with the congestion level of the first wireless base station 121 may be calculated. The number of terminals connected to the first wireless base station 121 is the number of wireless terminals connected to the first wireless base station 121 including the wireless terminal 130.

Control Based on Estimation of Connection Switching to Wireless Terminal Out of Control Alternatively, the computing unit 112 may estimate that some of the wireless terminals 130 are switchingly connected to a wireless base station other than the first wireless base station 121 and the second wireless base station 122. For example, the acquiring unit 111 further acquires the measurement result of the reception quality of a wireless signal that is sent from a wireless base station other than the first wireless base station 121 and the second wireless base station 122 and received by the wireless terminal 130. Thereafter, the computing unit 112 may estimate connection switching of the wireless terminal 130 based on the measurement results of reception quality acquired by the acquiring unit 111.

For example, if the wireless terminal 130 has the highest reception quality level for a wireless base station other than the first wireless base station 121 and the second wireless base station 122, the computing unit 112 estimates that the wireless terminal 130 is highly likely to be switchingly connected to the wireless base station.

If the computing unit 112 estimates that connection switching occurs, the computing unit 112 calculates the estimated value of the reception quality for each of the wireless terminals 130 other than the wireless terminal 130 that is estimated to be switchingly connected. In addition, the control unit 113 controls the transmission power levels using the estimated value of the reception quality for each of the wireless terminals 130 other than the wireless terminal 130 that is estimated to be switchingly connected.

In this manner, the transmission power levels may be controlled by using the estimated values of the reception quality of the wireless terminals 130 that are estimated to be connected to the first wireless base station 121 or the second wireless base station 122 in the future and, thus, interference may be reduced.

Second Exemplary Embodiment

Communication System According to Second Exemplary Embodiment

Figure 2:
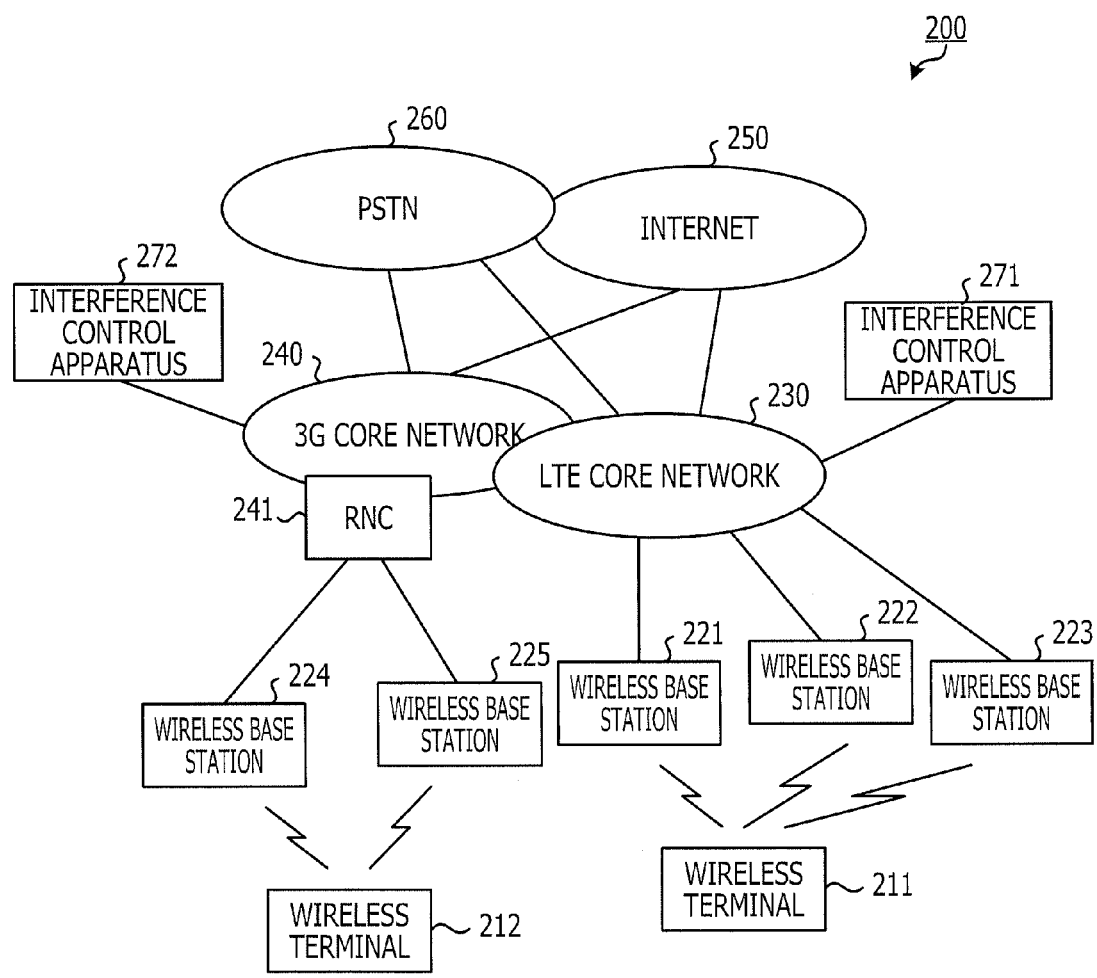
FIG. 2 illustrates an example of a communication system according to a second exemplary embodiment.

FIG. 2 illustrates an example of a communication system according to a second exemplary embodiment. As illustrated in FIG. 2, according to the second exemplary embodiment, a communication system 200 includes wireless terminals 211 and 212, wireless base stations 221 to 225, an LTE core network 230, and a 3G core network 240. In addition, the communication system 200 includes the Internet 250, a public switched telephone networks (PSTN) 260, and interference control apparatus 271 and 272.

The interference control apparatus 110 illustrated in FIGS. 1A and 1B may be realized by, for example, the interference control apparatus 271 or 272. The first wireless base station 121 and the second wireless base station 122 illustrated in FIGS. 1A and 1B may be realized by, for example, the wireless base stations 221 to 225. The wireless terminal 130 illustrated in FIGS. 1A and 1B may be realized by, for example, the wireless terminal 211 or 212.

For example, the wireless terminal 211 is user equipment (UE) located in an area that allows the UE to communicate with the wireless base stations 221 to 223. For example, the wireless terminal 212 is UE located in an area that allows the UE to communicate with the wireless base stations 224 and 225. A plurality of the wireless terminals 211 may be present, and a plurality of the wireless terminals 212 may be present.

The wireless base stations 221 to 223 are base stations connected to the LTE core network 230, which are known as eNodeB or eNB (evolved Node B). The wireless base stations 224 and 225 are base stations connected to the 3G core network 240, which are known as NodeB or NB (Node B). For example, the wireless base stations 224 and 225 are controlled by a radio network controller (RNC) 241 of the 3G core network 240.

Each of the wireless base stations 221 to 225 may be a macro base station that forms a wide area communication cell (a macrocell) or a femto base station that forms a small area communication cell. In the following description, each of the wireless base stations 221 to 225 is a femto base station with radio coverage of several ten meters. In addition, the transmission power level of each of the wireless base stations 221 to 225 may be set to one of −20 [dBm], −24 [dBm], and −28 [dBm] (reference signal power values).

The LTE core network 230 relays communication between each of the wireless base stations 221 to 223 and the Internet 250 and communication between each of the wireless base stations 221 to 223 and the PSTN 260 using the LTE standard. The 3G core network 240 relays communication between each of the wireless base stations 224 and 225 and the Internet 250 and communication between each of the wireless base stations 224 and 225 and the PSTN 260 using the 3G standard.

Each of the interference control apparatuses 271 and 272 is a control apparatus for automatically controlling the transmission power levels of a plurality of wireless base stations in a mobile wireless network in order to optimize the radio interference conditions in a particular service area formed by the wireless base stations. For example, the interference control apparatus 271 controls interference occurring in a wireless terminal (for example, the wireless terminal 211) by controlling the transmission power levels of the wireless base stations 221 to 223 via the LTE core network 230. The interference control apparatus 272 controls interference occurring in a wireless terminal (for example, the wireless terminal 212) by controlling the transmission power levels of the wireless base stations 224 and 225 via the 3G core network 240.

For example, the wireless base station 221 receives the radio quality level measured by the wireless terminal 211 and sends the radio quality level to the interference control apparatus 271. The interference control apparatus 271 analyzes the interference conditions of the wireless terminal and determines optimum transmission power levels of the wireless base stations 221 to 223. Thereafter, the interference control apparatus 271 changes the transmission power levels of the wireless base stations 221 to 223. Subsequently, the interference control apparatus 271 repeats the series of procedures in accordance of a change in the radio quality conditions of the wireless terminal 211. In this manner, the interference control apparatus 271 maintains the optimum radio quality of the wireless terminal.

Interference Control Apparatus According to Second Exemplary Embodiment

FIG. 3A illustrates an example of an interference control apparatus according to the second exemplary embodiment. FIG. 3B illustrates an example of the flow of signals in the interference control apparatus illustrated in FIG. 3A. Each of the interference control apparatuses 271 and 272 illustrated in FIG. 2 may be realized by an interference control apparatus 300 illustrated in FIGS. 3A and 3B. In the example illustrated in FIGS. 3A and 3B, the interference control apparatus 300 is used as the interference control apparatus 271.

The wireless terminal 211 is connected to the wireless base station 221, which is one of the wireless base stations 221 to 223 located in the vicinity of the wireless terminal 211. The wireless terminal 211 sends, to the wireless base station 221, radio quality information indicating the radio quality measured by the wireless terminal 211. The wireless base station 221 sends the radio quality information received from the wireless terminal 211 to the interference control apparatus 300.

The interference control apparatus 300 includes external interfaces 301 and 302, a radio quality information receiving unit 310, a radio quality information storage unit 320, a radio quality estimating unit 330, a base station information storage unit 340, an interference control unit 350, and a transmission power change control unit 360.

Note that while, in FIGS. 3A and 3B, description is made with reference to the radio quality information storage unit 320 and the base station information storage unit 340 each serving as a database, each of the radio quality information storage unit 320 and the base station information storage unit 340 is not limited to a database.

The acquiring unit 111 illustrated in FIGS. 1A and 1B may be realized by, for example, the external interface 301, the radio quality information receiving unit 310, and the radio quality information storage unit 320. The computing unit 112 illustrated in FIGS. 1A and 1B may be realized by, for example, the radio quality estimating unit 330. The control unit 113 illustrated in FIGS. 1A and 1B may be realized by, for example, the interference control unit 350, the transmission power change control unit 360, and the external interface 302.

The external interfaces 301 and 302 are interfaces that allow the interference control apparatus 300 to communicate with the outside. For example, the external interfaces 301 and 302 are maintenance interfaces (that comply with, for example, the TR-069 standard defined in Broadband Forum) using a local area network (LAN).

The radio quality information receiving unit 310 receives the radio quality information sent from the wireless base station 221 via the external interface 301. Thereafter, the radio quality information receiving unit 310 outputs the received radio quality information to the radio quality information storage unit 320.

The radio quality information storage unit 320 stores the radio quality information output from the radio quality information receiving unit 310. In addition, the radio quality information storage unit 320 may store the radio quality information at a plurality of points in time for each of the wireless terminals.

The radio quality information includes, for example, the identification information regarding the wireless terminal 211, the report time of the radio quality, and the radio reception quality. An example of the identification information of the wireless terminal 211 is international mobile subscriber identity (IMSI). An example of the radio reception quality is a signal noise ratio (SNR).

In addition, the radio quality information includes the identification information of a wireless base station, information as to whether the wireless base station is a connected base station or a neighboring base station, and the received power of the wireless terminal for each of the wireless base stations 221 to 223 from which the wireless terminal 211 receives radio waves. An example of the identification information of the wireless base station is physical cell identity (PCI). An example of the information as to whether the wireless base station is a connection base station or a neighboring base station is a serving/neighbor identification flag. An example of the received signal strength is reference signal received power (RSRP).

Upon receiving a calculation request from the interference control unit 350, the radio quality estimating unit 330 calculates the estimated value of the radio quality of the wireless terminal 211 at a time that is a predetermined period of time from the current time based on the radio quality information regarding each of the wireless terminals accumulated in the radio quality information storage unit 320. An example of the radio quality is the received power. For example, the radio quality estimating unit 330 calculates the estimated value of the received power of the wireless terminal 211 from each of the wireless base stations 221 to 223. Thereafter, the radio quality estimating unit 330 outputs, to the interference control unit 350, estimated radio quality information indicating the calculated estimated values of the received power.

For example, the radio quality estimating unit 330 may calculate the estimated value of the received power of the wireless terminal 211 from the wireless base station 221 in the future using past two received power levels received from the wireless base station 221 by the wireless terminal 211. For example, let past two received power levels be a first received power level (an older one) and a second received power level (a newer one). Then, the radio quality estimating unit 330 may calculate the estimated value of the received power in the future as follows: the second received power level+(the second received power level−the first received power level). Note that although the calculation is complicated, the estimated value of the received power in the future may be calculated using past three received power levels or more. In addition, an upper limit may be set for a correction range (for example, ±2 [dB]). In this manner, an estimation error may be reduced.

The base station information storage unit 340 stores base station information regarding the wireless base stations 221 to 223. The base station information includes, for example, the identification information, the current transmission power level (the current reference signal power), and manager apparatus information for each of the wireless base stations 221 to 223. An example of the identification information of a wireless base station is PCI. The manager apparatus information indicates the interference control apparatus that controls the transmission power level of the wireless base station (the interference control apparatus 300 in this example). Note that the manager apparatus information may include information regarding the address of the interference control apparatus. An example of the information regarding the address of the interference control apparatus is a uniform resource identifier (URI).

The interference control unit 350 performs the interference control on the wireless base stations 221 to 223. More specifically, the interference control unit 350 includes an interference control execution control unit 351 and a transmission power level calculation unit 352. The interference control execution control unit 351 sends, to the transmission power level calculation unit 352, a calculation request for calculating the transmission power level periodically (for example, at intervals of 10 seconds). As a response to the request, the transmission power level calculation unit 352 receives information regarding a wireless base station having the transmission power level to be changed among the wireless base stations 221 to 223 and a new transmission power level. Thereafter, the interference control execution control unit 351 generates a transmission power change request, which is a signal based on the received result, and sends the transmission power change request to the target wireless base station among the wireless base stations 221 to 223 via the transmission power change control unit 360.

Upon receiving a calculation request from the interference control execution control unit 351, the transmission power level calculation unit 352 acquires, from the radio quality estimating unit 330, the estimated radio quality information indicating the radio quality at a time that is a predetermined period of time from the current time. The predetermined period of time (for example, "T" in FIG. 7) may be set to a period of time based on the transmission power level switching time for the wireless base stations 221 to 223. For example, if the transmission power level switching time is 5 seconds, the predetermined period of time may be set to 4 seconds, which is shorter than 5 seconds by 1 second, in consideration of an error. The transmission power level calculation unit 352 calculates an optimum transmission power level for each of the wireless base stations 221 to 223 based on the acquired estimated radio quality information.

The transmission power change control unit 360 sends the transmission power change request output from the interference control unit 350 to the wireless base stations 221 to 223 via the external interface 302. In this manner, the transmission power change control unit 360 controls the transmission power levels of the wireless base stations 221 to 223. In addition, after changing the transmission power levels of the wireless base stations 221 to 223, the transmission power change control unit 360 updates the base station information stored in the base station information storage unit 340 to update the changed transmission power levels of the wireless base stations 221 to 223.

Hardware Configuration of Interference Control Apparatus

Figure 4:
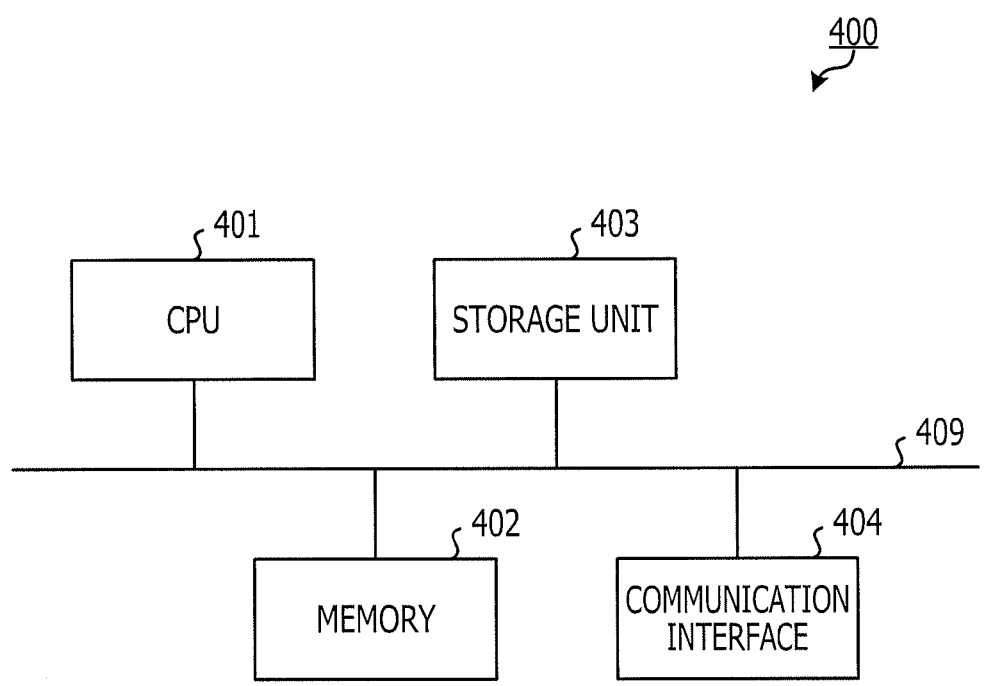
FIG. 4 illustrates an example of the hardware configuration of the interference control apparatus.

FIG. 4 illustrates an example of the hardware configuration of the interference control apparatus. The interference control apparatus 300 illustrated in FIGS. 3A and 3B may be realized using, for example, an information processing apparatus 400 illustrated in FIG. 4. The information processing apparatus 400 includes a central processing unit (CPU) 401, a memory 402, a storage unit 403, and a communication interface 404. The CPU 401, the memory 402, the storage unit 403, and the communication interface 404 are connected to one another via a bus 409.

The CPU 401 performs overall control of the information processing apparatus 400. The memory 402 serves as a main memory, which is used by the CPU 401 as a work area. For example, a random access memory (RAM) may be used as the memory 402.

For example, the storage unit 403 is an auxiliary memory formed from a nonvolatile memory, such as a hard disk drive (HDD). The storage unit 403 stores a variety of programs and data items used for operating the information processing apparatus 400. The programs stored in the storage unit 403 may include, for example, an operating system (OS). Each of the programs stored in the memory 403 is loaded into the memory 402 and is executed by the CPU 401.

The communication interface 404 is a communication interface that allows, for example, wired communication between the information processing apparatus 400 and the outside (for example, the LTE core network 230 and the 3G core network 240). For example, the communication interface 404 is a LAN interface. The communication interface 404 is controlled by the CPU 401.

The interference control apparatus 300 may further include a human interface used for setting up a variety of parameters of the interference control apparatus 300. The human interface includes, for example, an input device used by a user to perform an input operation and an output device used for outputting information to the user. The input device may be formed from, for example, keys (for example, a keyboard) and a mouse. The output device may be formed from, for example, a display. The human interface is controlled by the CPU 401.

Each of the external interfaces 301 and 302 illustrated in FIGS. 3A and 3B may be formed from the communication interface 404. Each of the radio quality information receiving unit 310, the radio quality estimating unit 330, the interference control unit 350, and the transmission power change control unit 360 illustrated in FIGS. 3A and 3B is realized by, for example, the program stored in the storage unit 403 and executed by the CPU 401. The radio quality information storage unit 320 and the base station information storage unit 340 illustrated in FIGS. 3A and 3B may be formed from, for example, the memory 402 or the storage unit 403.

Processing Performed by Interference Control Apparatus

Figure 5:
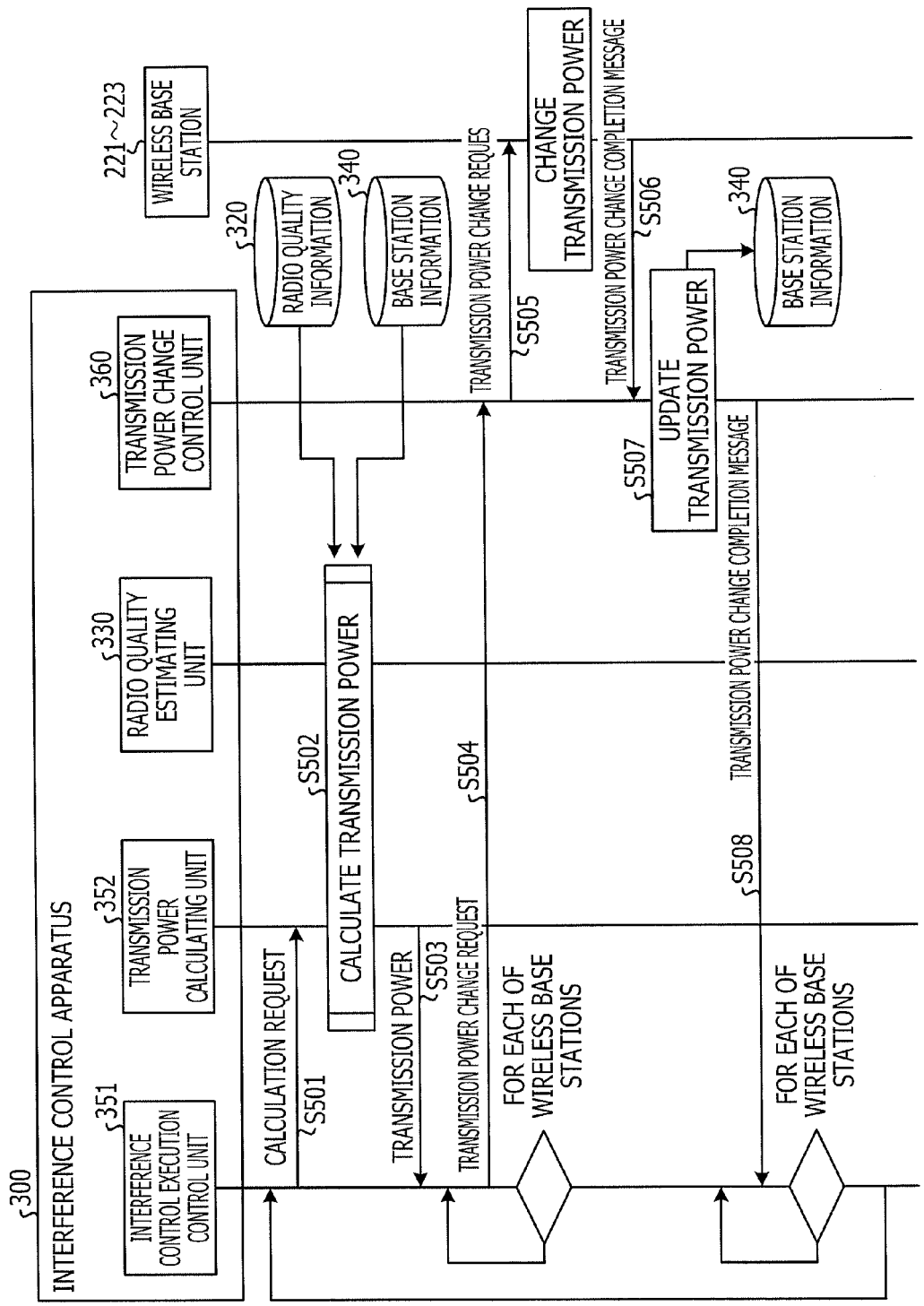
FIG. 5 is a sequence diagram illustrating an example of the processing performed by the interference control apparatus.

FIG. 5 is a sequence diagram illustrating an example of the processing performed by the interference control apparatus. For example, the interference control apparatus 300 periodically performs the steps illustrated in FIG. 5. In an example illustrated in FIG. 5, the case in which the interference control apparatus 300 (the interference control apparatus 271 illustrated in FIG. 2) controls the transmission power levels of the wireless base stations 221 to 223 is discussed.

The interference control execution control unit 351 sends a calculation request for the transmission power level to the transmission power level calculation unit 352 first (step S501). Subsequently, the transmission power level calculation unit 352 and the radio quality estimating unit 330 calculate the transmission power levels of the wireless base stations 221 to 223 based on the information items stored in the radio quality information storage unit 320 and the base station information storage unit 340 (step S502). The calculation of the transmission power levels performed in step S502 is described in more detail below (refer to, for example, FIG. 6).

Subsequently, the transmission power level calculation unit 352 sends, to the interference control execution control unit 351, the transmission power levels of the wireless base stations 221 to 223 calculated in step S502 (step S503). Thereafter, the interference control execution control unit 351 outputs, to the transmission power change control unit 360, a transmission power change request for requesting the wireless base station to change its transmission power level to the transmission power level sent in step S503 (step S504). Note that the process of step S504 is performed for each of the wireless base stations 221 to 223.

Subsequently, the transmission power change control unit 360 sends, to the target wireless base station among the wireless base stations 221 to 223, the transmission power change request output in step S504 (step S505). Each of the wireless base stations 221 to 223 changes the transmission power level for a wireless signal sent therefrom in accordance with the transmission power change request sent in step S505. Thereafter, each of the wireless base stations 221 to 223 sends a transmission power change completion message to the interference control apparatus 300.

Subsequently, the transmission power change control unit 360 receives the transmission power change completion message sent from each of the wireless base stations 221 to 223 (step S506). Thereafter, the transmission power change control unit 360 updates the base station information stored in the base station information storage unit 340 based on the transmission power change completion message received in step S506 to update the changed transmission power levels of the wireless base stations 221 to 223 (step S507).

In addition, the transmission power change control unit 360 may output the transmission power change completion message received in step S506 to the interference control execution control unit 351 (step S508). Upon receiving the transmission power change completion messages for the wireless base stations 221 to 223 from the transmission power change control unit 360, the interference control execution control unit 351 waits for the next execution cycle, and the processing returns to step S501. In this manner, the interference control execution control unit 351 periodically performs the interference control.

Calculation of Transmission Power Level

Figure 6:
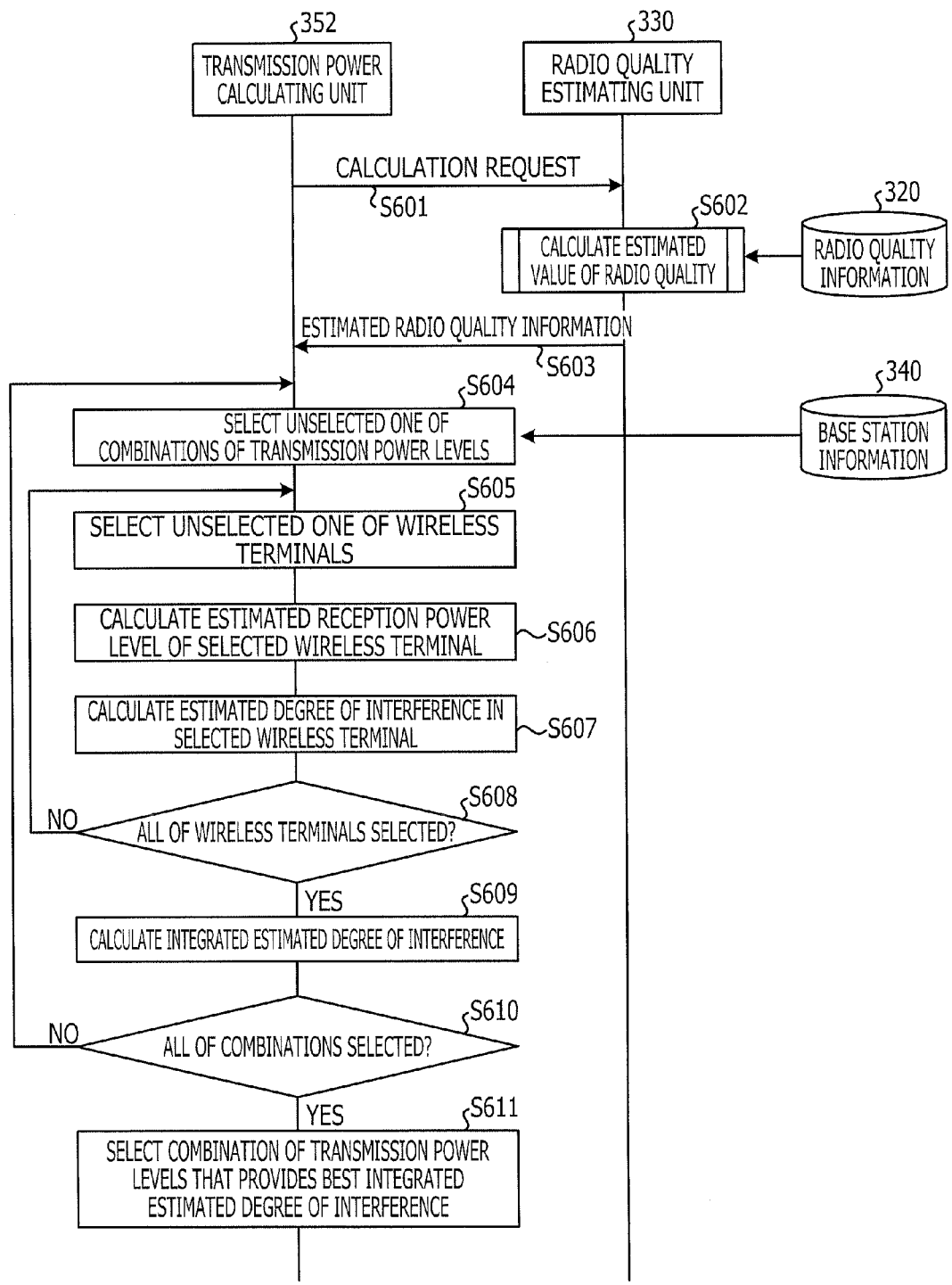
FIG. 6 is a sequence diagram illustrating an example of calculation of a transmission power level.

FIG. 6 is a sequence diagram illustrating an example of calculation of a transmission power level. In step S502 illustrated in FIG. 5, the transmission power level calculation unit 352 and the radio quality estimating unit 330 perform, for example, the steps illustrated in FIG. 6. The transmission power level calculation unit 352 sends, to the radio quality estimating unit 330, a calculation request for calculating the estimated value of the radio quality first (step S601).

Subsequently, the radio quality estimating unit 330 calculates the estimated value of the radio quality for each of the wireless base stations 221 to 223 based on the radio quality information stored in the radio quality information storage unit 320 (step S602). The calculation process of the estimated value of the radio quality performed in step S602 is described in more detail below (refer to, for example, FIG. 7). Thereafter, the radio quality estimating unit 330 outputs the estimated radio quality information indicating the estimated value calculated in step S602 to the transmission power calculating unit 352 (step S603).

Subsequently, the transmission power level calculation unit 352 selects, from among combinations of the transmission power levels of the wireless base stations 221 to 223, a combination unselected yet in this step (step S604). For example, if the transmission power level of each of the wireless base stations 221 to 223 is to be changed to one of −20 [dBm], −24 [dBm], and −28 [dBm], there are 27 (=3·3·3) combinations of the transmission power levels of the wireless base stations 221 to 223.

Subsequently, the transmission power level calculation unit 352 selects, from among the wireless terminals currently connected to the wireless base stations 221 to 223, a wireless terminal unselected yet in this step (for example, the wireless terminal 211) (step S605).

Subsequently, the transmission power level calculation unit 352 calculates an estimated reception power level of the wireless terminal selected in step S605 based on the estimated radio quality information acquired in step S603 (step S606). At that time, the transmission power level calculation unit 352 calculates the estimated reception power levels for the combination of the transmission power levels selected in step S604.

For example, the transmission power level calculation unit 352 calculates the estimated reception power level by correcting RSRP indicated by the estimated radio quality information using a difference between the current transmission power level and the transmission power level selected in step S604 for each of the wireless base stations 221 to 223. For example, let the current transmission power level of the transmission power calculating unit 352 be −24 [dBm], and let the selected transmission power level be −28 [dBm]. Then, the transmission power level calculation unit 352 calculates the estimated reception power level by decreasing RSRP indicated by the estimated radio quality information by −4 [dBm] (=−28 [dBm]−(−24 [dBm])).

Subsequently, the transmission power level calculation unit 352 calculates the estimated degree of interference (SNR) in the wireless terminal selected in step S605 based on the estimated reception power level calculated in step S606 (step S607). In step S607, the transmission power level calculation unit 352 may calculate the estimated degree of interference as follows:

estimated degree of interference(SNR)=(serving estimated reception power level)/(sum of estimated reception power levels of other wireless base stations)     (1).

Where the serving estimated reception power level is, for example, the highest estimated reception power level among the estimated reception power levels of the wireless base stations 221 to 223. Note that if RSRP in the radio quality information is a logarithmic value, equation (1) may be calculated after RSRP is converted into an antilog power value.

Subsequently, the transmission power level calculation unit 352 determines whether all of the wireless terminals currently connected to the wireless base stations 221 to 223 have been selected in step S605 (step S608). If at least one wireless terminal has not been selected (No in step S608), the processing performed by the transmission power level calculation unit 352 returns to step S605.

However, if, in step S608, it is determined that all of the wireless terminals currently connected to the wireless base stations 221 to 223 have been selected (Yes in step S608), the processing performed by the transmission power level calculation unit 352 proceeds to step S609. That is, the transmission power level calculation unit 352 calculates an integrated estimated degree of interference for all of the wireless terminals connected to the wireless base stations 221 to 223 based on the estimated degree of interference calculated in step S607 (step S609). For example, the transmission power level calculation unit 352 calculates the average value of the estimated degrees of interference computed for all of the wireless terminals as the integrated estimated degree of interference. However, the integrated estimated degree of interference is not limited to an average value. For example, one of a variety of types of value (for example, the lowest estimated degree of interference) may be selected as the integrated estimated degree of interference.

Subsequently, the transmission power level calculation unit 352 determines whether all of the combinations of the transmission power levels of the wireless base stations 221 to 223 have been selected in step S604 (step S610). If at least one of the combinations has not been selected (No in step S610), the processing performed by the transmission power level calculation unit 352 returns to step S604.

However, if, in step S610, it is determined that all of the combinations have been selected (Yes in step S610), the processing performed by the transmission power level calculation unit 352 proceeds to step S611. That is, the transmission power level calculation unit 352 selects, from among the combinations of the transmission power levels of the wireless base stations 221 to 223, a combination that provides the best integrated estimated degree of interference calculated in step S609 as the transmission power levels of the wireless base stations 221 to 223 (step S611). Thereafter, the transmission power level calculation unit 352 and the radio quality estimating unit 330 complete the series of calculation processes.

Note that the combination that provides the best integrated estimated degree of interference may be, for example, a combination that provides the highest integrated estimated degree of interference (SNR) (that is, the least amount of interference). In addition, if the current integrated degree of interference is better than the integrated estimated degree of interference, the transmission power level calculation unit 352 may return the current transmission power levels of the wireless base stations 221 to 223.

Calculation of Estimated Value of Radio Quality

FIG. 7 is a flowchart of an example of a calculation process of the estimated value of the radio quality. For example, in step S602 illustrated in FIG. 6, the radio quality estimating unit 330 performs the processes in the steps illustrated in FIG. 7 for each of the wireless terminals connected to any one of the wireless base stations 221 to 223 (for example, the wireless terminal 211). In this manner, the radio quality estimating unit 330 calculates the estimated value of the radio quality at a time that is T seconds from the current time.

The radio quality estimating unit 330 acquires, from the radio quality information storage unit 320, two radio quality information items within the past 2·T seconds of the current time (step S701). Thereafter, the radio quality estimating unit 330 determines whether the acquisition of two radio quality information items performed in step S701 is successful (step S702).

If, in step S702, it is determined that the acquisition is successful (Yes in step S702), the radio quality estimating unit 330 determines whether reception cells (the wireless base stations) in the two radio quality information items acquired in step S701 are duplicated (step S703). If two reception cells are duplicated (Yes in step S703), the radio quality estimating unit 330 selects one of the reception cells in the newer one of the two radio quality information items acquired in step S701 if the reception cell has not yet been selected in this step (step S704).

Subsequently, the radio quality estimating unit 330 determines whether the reception cell selected in step S704 is also included in the older one of the two radio quality information items acquired in step S701 (step S705). If the selected reception cell is included in the older radio quality information item (Yes in step S705), the radio quality estimating unit 330 calculates the estimated value of the radio quality based on the two radio quality information items (step S706).

In step S706, the radio quality estimating unit 330 calculates an estimated value V3 of the radio quality of the reception cell (the wireless base station) selected in step S704 at a time that is T seconds from the current time using, for example, the following equations:

$$V3 = D \cdot T + V2$$

$$D = (V2 - V1)/(T2 - T1) \quad\quad (2)$$

where V1 and V2 denote the radio quality (the received powers) indicated by the two radio quality information items acquired in step S701, and T1 and T2 denote the report times of the two radio quality information items acquired in step S701.

Subsequently, the radio quality estimating unit 330 determines whether all of the reception cells in the newer one of the two radio quality information items acquired in step S701 have been selected in step S704 (step S707). If at least one of the reception cells has not yet been selected (No in step S707), the processing performed by the radio quality estimating unit 330 returns to step S704. However, if all of the reception cells have been selected (Yes in step S707), the radio quality estimating unit 330 completes the series of calculation processes.

If, in step S705, the selected reception cell is not included in the older one of the radio quality information items (No in step S705), the processing performed by the radio quality estimating unit 330 proceeds to step S708. That is, the radio quality estimating unit 330 selects the received power indicated by the newer one of the two radio quality information items as the estimated value of the radio quality of the reception cell selected in step S704 at a time that is T seconds from the current time (step S708). Thereafter, the processing proceeds to step S707.

However, if, in step S703, two reception cells are not duplicated (No in step S703), the radio quality estimating unit 330 (No in step S703), the processing performed by the radio quality estimating unit 330 proceeds to step S709. That is, the radio quality estimating unit 330 selects the received power indicated by the newer one of the two radio quality information items as the estimated value of the radio quality of the wireless base stations 221 to 223 (step S709). Thereafter, the series of calculation processes is completed.

If, in step S702, the acquisition is not successful (No in step S702), the radio quality estimating unit 330 acquires, from the radio quality information storage unit 320, one radio quality information item within the past 2·T seconds of the current time (step S710). Thereafter, the radio quality estimating unit 330 determines whether the acquisition of the radio quality information item in step S710 is successful (step S711).

If, in step S711, the acquisition is successful (Yes in step S711), the processing performed by the radio quality estimating unit 330 proceeds to step S712. That is, the radio quality estimating unit 330 selects the received power indicated by the radio quality information item acquired in step S710 as the estimated value of the radio quality of the wireless base stations 221 to 223 (step S712). Thereafter, the series of the calculation process is completed. However, if the acquisition is not successful (No in step S711), the radio quality estimating unit 330 determines that calculation of the estimated value of the radio quality is not available. Thereafter, the series of the calculation process is completed.

Through the above-described steps, the estimated value of the radio quality for each of the wireless base stations 221 to 223 may be calculated. In addition, by using the radio quality information within the past 2·T seconds of the current time, the error may be reduced. In addition, if the number of the radio quality information items within the past 2·T seconds of the current time is one, estimation is not available. Accordingly, the radio quality information item may be returned as the estimated value.

In addition, if the number of the radio quality information items within the past 2·T seconds of the current time is one, the estimated value at a point in time that is T seconds from the current time may be calculated by applying a widely used linear approximate equation to the received power from the same wireless base station in the newer radio quality information item, and the received power may be corrected. That is, if the radio quality information regarding the wireless base station in the older radio quality information item that is the same as in the newer radio quality information item is present, estimation may be performed by correcting the radio quality information.

Positions of Wireless Base Stations and Wireless Terminal

Figure 8A:
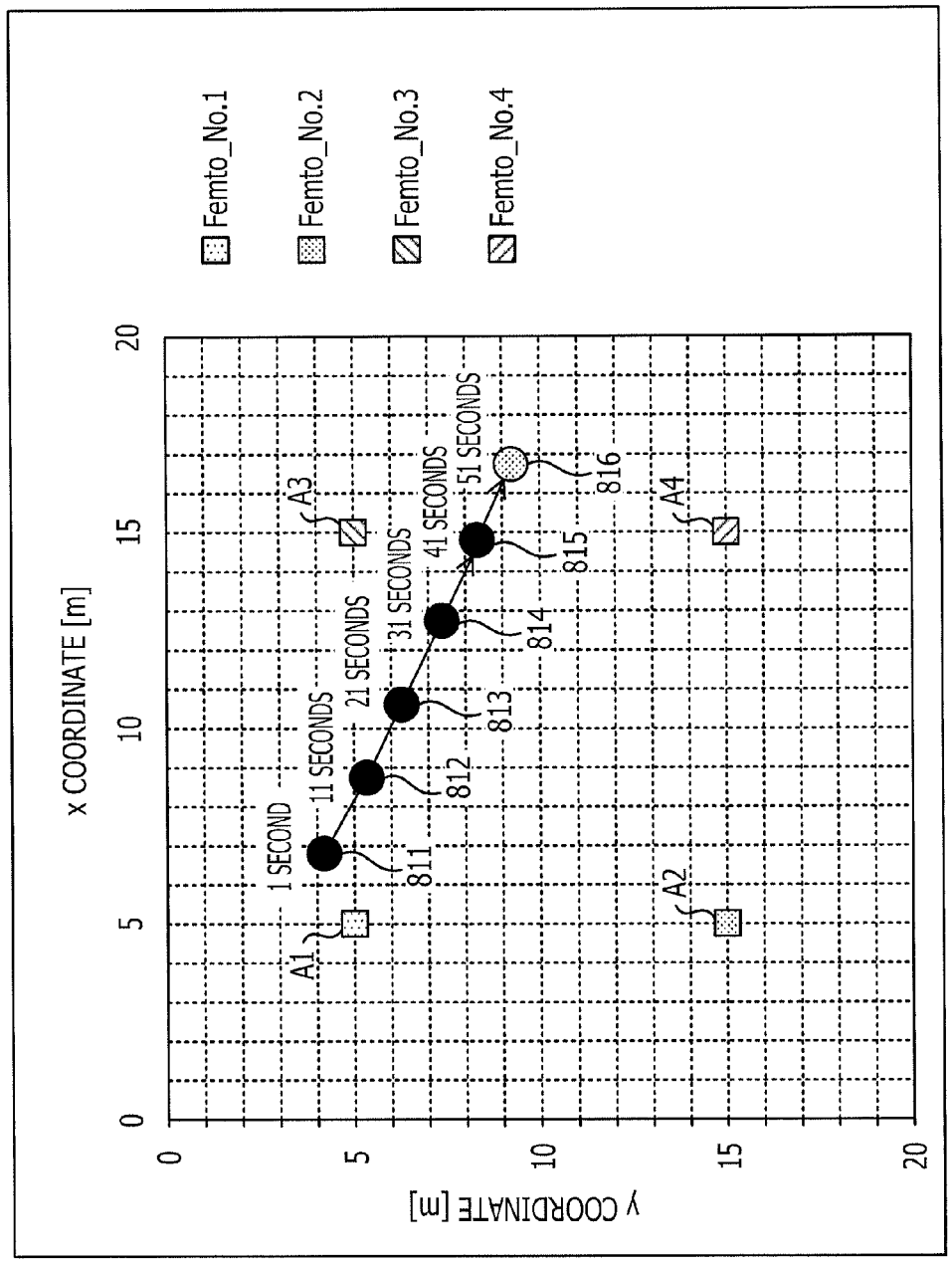
FIG. 8A illustrates an example of the positions of wireless base stations and a wireless terminal.

FIG. 8A illustrates an example of the positions of the wireless base stations and the wireless terminal. In FIG. 8A, the abscissa represents x coordinate [m], and the ordinate represents y coordinate [m]. Wireless base stations A1 to A4 are, for example, femto base stations (Femto_No1 to Femto_No4) including the wireless base stations 221 to 223. Positions 811 to 816 are the positions of the wireless terminal 211 at points in time that are 1 second, 11 seconds, 21 seconds, 31 seconds, 41 seconds, and 51 seconds from a predetermined point in time, respectively. Note that, for example, the current time is a time that is 45 seconds from the predetermined point in time and, thus, the position 816 at the time that is 51 seconds from the predetermined point in time is a future position.

Radio Quality Information Table

FIG. 8B illustrates an example of a radio quality information table. In the case illustrated in FIG. 8A, the radio quality information storage unit 320 stores, for example, a radio quality information table 820 illustrated in FIG. 8B. The radio quality information table 820 contains the radio quality information items received by the radio quality information receiving unit 310.

In addition, the radio quality information items contained in the radio quality information table 820 illustrated in FIG. 8B indicate the radio quality levels measured by the wireless terminal 211 when the transmission power levels of each of the wireless base stations 221 to 223 is −18 [dBm].

The radio quality information storage unit 820 includes the following fields: "time information", "terminal ID", "received power", "cell to connect to", and "SNR". The "terminal ID" field contains the ID of a wireless terminal that measured the radio quality. In an example illustrated in FIG. 8B, the terminal ID of the wireless terminal 211 is "MA". The "time information" field contains the report time of the received power (the measurement time). In the example illustrated in FIG. 8B, the time information represents the number of seconds that elapse from the predetermined point in time.

The "received power" field contains the actual measurement value of the received power (RSRP) [dBm] of the wireless terminal indicated by the terminal ID field (that is, the wireless terminal 211) for each of cells having cell IDs of "A1" to "A4" (the wireless base stations A1 to A4).

The "cell to connect to" field contains the name of a cell with which the wireless terminal indicated by the "terminal ID" field (that is, the wireless terminal 211) is connected. In the example illustrated in FIG. 8B, the wireless terminal 211 is connected to the wireless base station A1 during a period of time from time "1" to time "11" and, thereafter, is connected to the wireless base station A3 during a period of time from time "21" to time "41" with a change in the position of the wireless terminal 211 illustrated in FIG. 8A. The "SNR" field contains a value calculated using the values in the "received power" field and the "cell to connect to" field. If the wireless terminal 211 receives another noise component, the value of SNR decreases.

Change in Received Power in Each Cell

FIG. 8C is a graph illustrating an example of a change in the received power in each cell. In FIG. 8C, the abscissa represents a time indicated by the time information, and the ordinate represents the received power [dBm]. Received power levels 831 to 834 (series 1 to 4) indicate changes in the received power level [dBm] of the wireless terminal 211 for the wireless base stations A1 to A4, respectively. The received power levels 831 to 834 correspond to the radio quality information table 820 illustrated in FIG. 8B.

In such a case, the radio quality estimating unit 330 calculates the estimated value of the radio quality at time "51" (after T seconds elapse) based on, for example, the radio quality information items corresponding to times "31" and "41" using a widely used linear approximate equation. That is, the estimated value is calculated by correcting the newer radio quality information item corresponding to time "41" using the older radio quality information item corresponding to time "31".

For example, let P31 be the received power level at time "31", and let P41 be the received power level at time "41". Then, an estimated value P51 of the received power at time "51" may be computed as follow:

$$P51=P41+((51-41)*(P41-P31)/(41-31)) \quad (3).$$

Actual Measurement Value and Estimated Value

FIG. 8D illustrates an example of the actual measurement value and the estimated value. A radio quality information item 841 illustrated in FIG. 8D indicates the actual measurement values of the received power (RSRP) levels for the wireless base stations A1 to A4 at time "51". A radio quality information item 842 illustrated in FIG. 8D indicates the estimated values of the received power levels for the wireless base stations A1 to A4 at time "51" obtained by using the radio quality information table 820 and equation (3).

As indicated by the radio quality information item 841 and the radio quality information item 842, an accurate estimated value of the radio quality level may be calculated using the radio quality information items stored in the radio quality information table 820 and equation (3).

In this manner, according to the interference control apparatus 300 of the second exemplary embodiment, even when the wireless terminal 211 connected to the wireless base station 221 moves, the transmission power levels of the wireless base stations 221 to 223 may be optimally changed by estimating the movement. Accordingly, an optimum communication environment may be provided to the wireless terminal 211 so that the radio wave interference is minimized at all times.

Third Exemplary Embodiment

The differences of a third exemplary embodiment from the second exemplary embodiment are described below.

Interference Control Apparatus According to Third Exemplary Embodiment

Figure 9A:
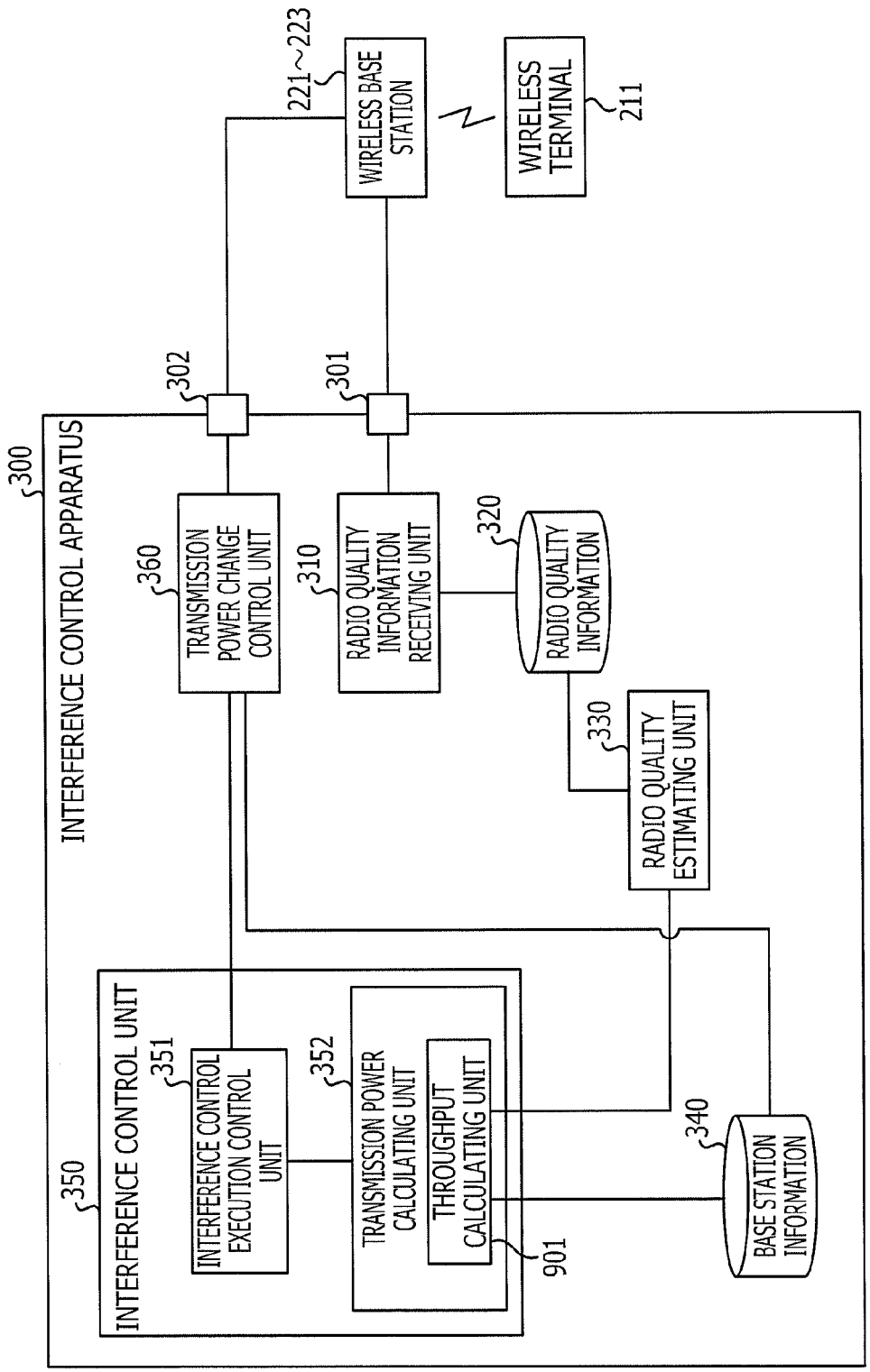
FIG. 9A illustrates an example of an interference control apparatus according to a third exemplary embodiment.

FIG. 9A illustrates an example of an interference control apparatus according to the third exemplary embodiment. FIG. 9B illustrates an example of the flow of signals in the interference control apparatus illustrated in FIG. 9A. In FIGS. 9A and 9B, the same numbering is used for the elements as is utilized in FIGS. 3A and 3B, and descriptions of the elements are not repeated. As illustrated in FIGS. 9A and 9B, a transmission power calculating unit 352 of the interference control apparatus 300 according to the third exemplary embodiment includes a throughput calculating unit 901.

The throughput calculating unit 901 calculates the degree of interference (for example, SNR) based on the radio quality information and the base station information. Thereafter, the throughput calculating unit 901 calculates estimated throughput of each of wireless terminals based on the calculated degree of interference. The transmission power calculating unit 352 calculates the optimum transmission power levels of the wireless base stations 221 to 223 based on the estimated throughput calculated by the throughput calculating unit 901.

Calculation of Transmission Power Level According to Third Exemplary Embodiment

FIG. 10 is a sequence diagram illustrating an example of calculation of the transmission power level according to the third exemplary embodiment. In step S502 illustrated in FIG. 5, the transmission power calculating unit 352 and the radio quality estimating unit 330 according to the third exemplary embodiment perform the processes in steps illustrated in FIG. 10.

Steps S1001 to S1011 illustrated in FIG. 10 are similar to steps S601 to S611 illustrated in FIG. 6, respectively. However, in step S1007, the transmission power calculating unit 352 calculates the estimated throughput based on the estimated degree of interference using the throughput calculating unit 901 (step S1007). For example, in step S1007, the throughput calculating unit 901 may calculate the SNR. Thereafter, the throughput calculating unit 901 may calculate the estimated throughput [bps] using the calculated SNR and the Shannon-Hartley theorem as follows:

$$\text{Estimated throughput}=\text{bandwidth} \cdot \log_2(1+\text{SNR}) \quad (4).$$

Note that the SNR is calculated as antilog.

Note that the estimated throughput is measured when only one wireless terminal is connected to a wireless base station. If a plurality of wireless terminals are connected to a target wireless base station, the throughput calculating unit 901 may correct the result of calculation of the estimated throughput in accordance with the number of wireless terminals connected to the target wireless base station.

For example, when three wireless terminals are connected to the target wireless base station and if the estimated throughput values of the three wireless terminals are 60 [Mbps], 45 [Mbps], and 30 [Mbps], the throughput calculating unit 901 may correct the results of calculation of the estimated throughput values to one third of the throughput values, that is, 20 [Mbps], 15 [Mbps], and 10 [Mbps].

In addition, in step S1009, the transmission power calculating unit 352 calculates the integrated estimated throughput of all of the wireless terminal currently connected to the wireless base stations 221 to 223 based on the estimated throughput calculated in step S1007 (step S1009). In step S1009, the transmission power calculating unit 352 calculates the harmonic average value of the estimated throughput values calculated for all of the wireless terminals as the integrated estimated throughput value. Let TH1, TH2, TH3, . . . , THn [bps] be the estimated throughput values of all of the wireless terminals. Then, the harmonic average value may be calculated as follows:

$$\text{harmonic average value}=(n \cdot TH1 \cdot TH2 \cdot \ldots \cdot Hn)/(TH1+TH2+\ldots+THn) \quad (5).$$

In addition, in step S1011, the transmission power calculating unit 352 selects a combination that provides the best integrated estimated throughput calculated in step S1009 as the transmission power levels of the wireless base stations 221 to 223 (step S1011). Note that a combination that maximizes the estimated throughput may be selected as the combination that maximizes the integrated estimated throughput.

Result of Calculation of Estimated Throughput

FIG. 11 illustrates an example of the result of calculation of the estimated throughput. A table 1100 illustrated in FIG. 11 indicates the result of estimation of the estimated throughput based on SNR. In the table 1100, the value in an "SNR [dB]" field is a logarithmic value. The value in an "SNR (antilog)" field is a value obtained by converting the logarithmic value into an antilog value. A "data rate [Mbps]" field contains the estimated throughput calculated from the antilog SNR using equation (4).

Note that in LTE with a bandwidth of 10 [MHz], the maximum throughput is 75 [Mbps]. Accordingly, if the calculated estimated throughput is higher than 75 [Mbps], the throughput calculating unit 901 may set the estimated throughput to 75 [Mbps].

As described above, according to the interference control apparatus 300 of the third exemplary embodiment, the estimated throughput may be calculated from the estimated degree of interference and, thereafter, the estimated throughput may be corrected in consideration of the number of wireless terminals connected to one wireless base station. In this manner, the transmission power levels of the wireless base stations 221 to 223 may be controlled using the highly accurate estimated throughput. As a result, the transmission power levels of the wireless base stations 221 to 223 may be controlled so that the future throughput of the wireless terminal 211 is optimized.

Fourth Exemplary Embodiment

The differences of a fourth exemplary embodiment from the second exemplary embodiment are described below.

Interference Control Apparatus According to Fourth Exemplary Embodiment

Figure 12A:
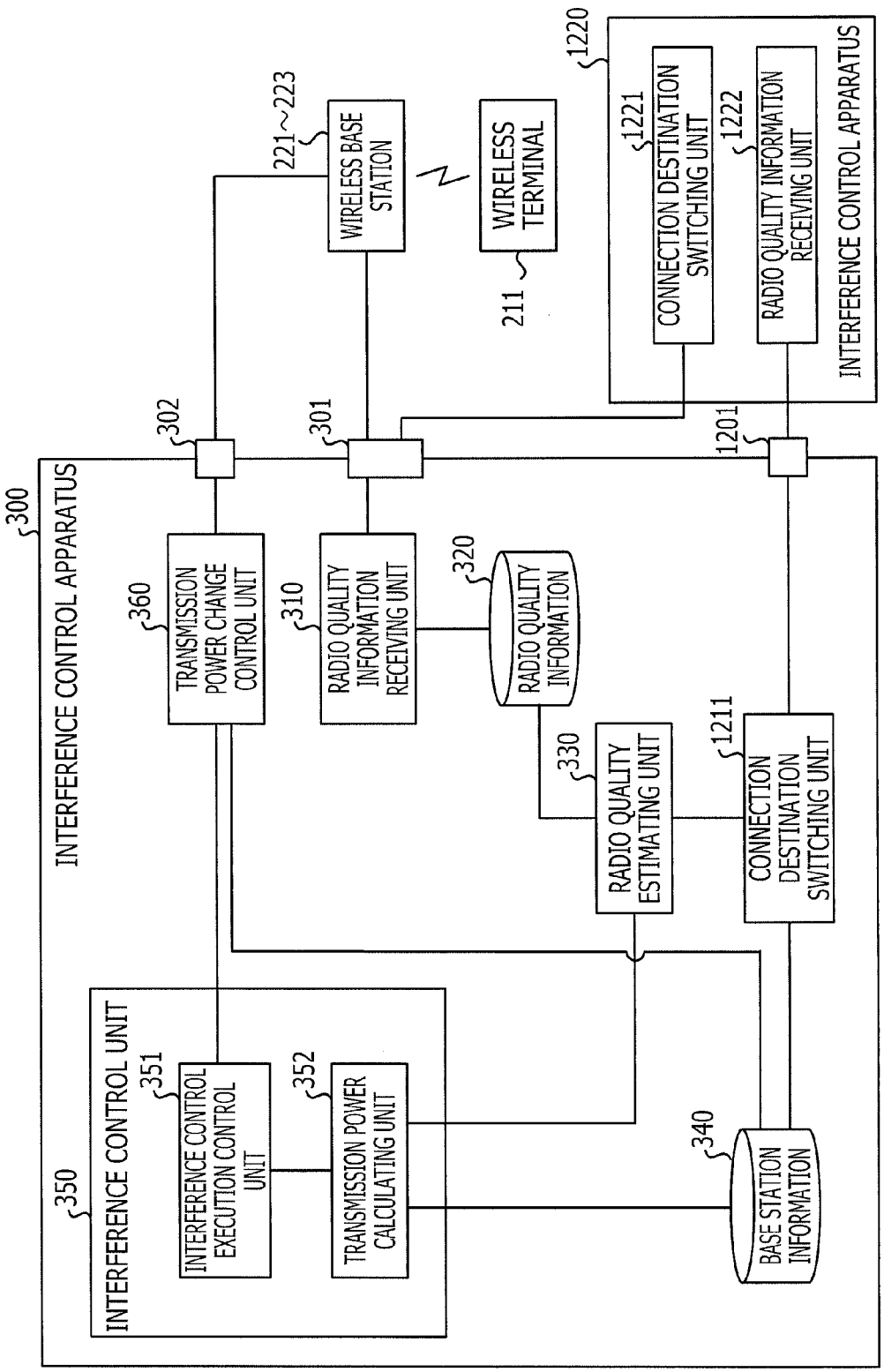
FIG. 12A illustrates an example of an interference control apparatus according to a fourth exemplary embodiment.
Figure 12B:
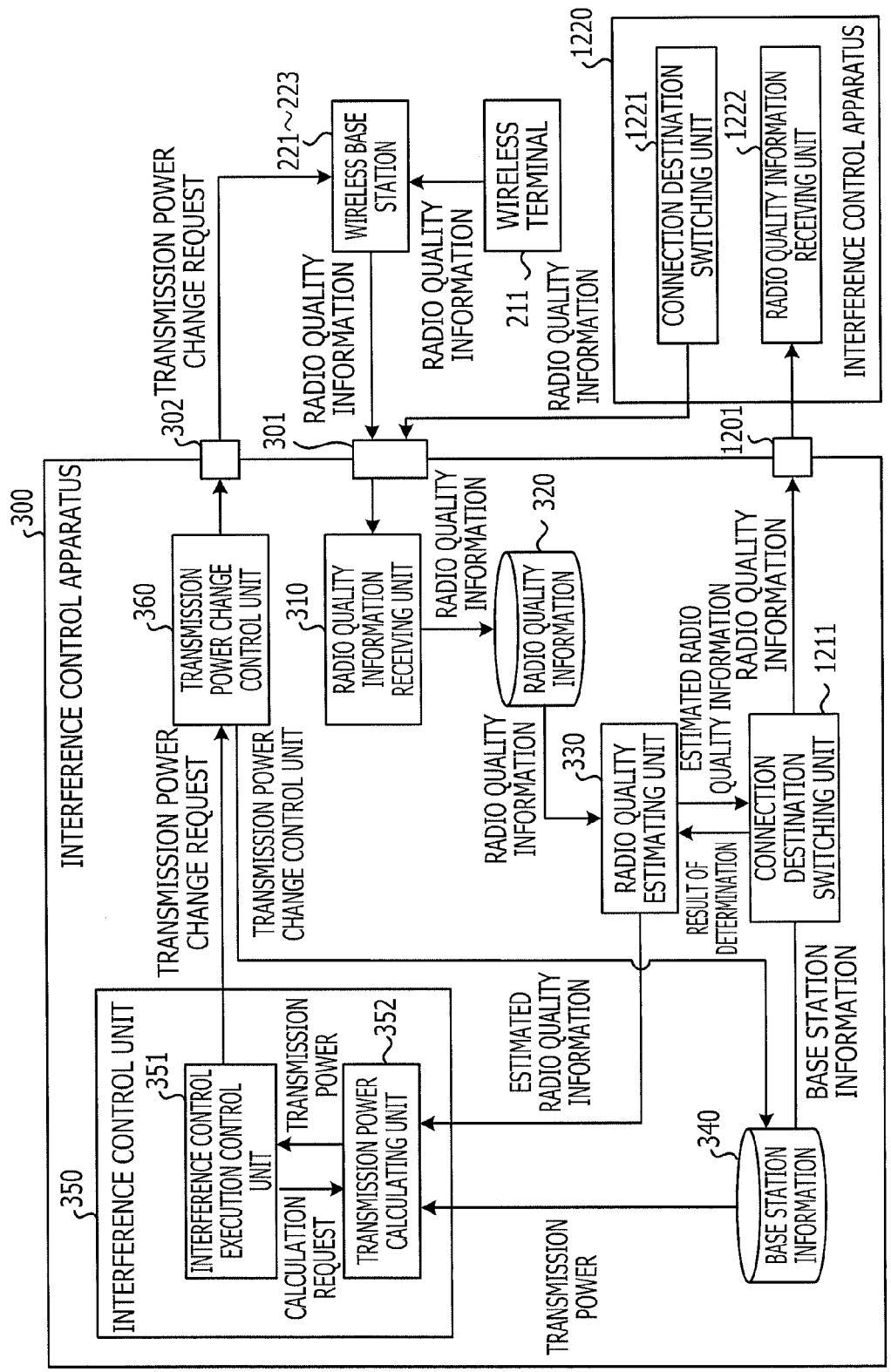
FIG. 12B illustrates an example of the flow of signals in the interference control apparatus illustrated in FIG. 12A.

FIG. 12A illustrates an example of an interference control apparatus according to the fourth exemplary embodiment. FIG. 12B illustrates an example of the flow of signals in the interference control apparatus illustrated in FIG. 12A. In FIGS. 12A and 12B, the same numbering is used for the elements as is utilized in FIGS. 3A and 3B, and descriptions of the elements are not repeated. As illustrated in FIGS. 12A and 12B, the interference control apparatus 300 according to the fourth exemplary embodiment includes an external interface 1201 and a connection destination switching unit 1211 in addition to the configuration illustrated in FIGS. 3A and 3B.

According to the fourth exemplary embodiment, the base station information storage unit 340 stores the base station information regarding a wireless base station controlled by an interference control apparatus 1220 that differs from the interference control apparatus 300 in addition to the base station information regarding the wireless base stations 221 to 223 whose interference is controlled by the interference control apparatus 300 (refer to FIG. 15B). For example, the interference control apparatus 1220 has a configuration similar to that of the interference control apparatus 300. In FIGS. 12A and 12B, only a connection destination switching unit 1221 and a radio quality information receiving unit 1222 of the interference control apparatus 1220, which correspond to the connection destination switching unit 1211 and the radio quality information receiving unit 310, respectively, are illustrated.

By outputting the estimated radio quality information to the connection destination switching unit 1211, the radio quality estimating unit 330 requests the connection destination switching unit 1211 to determine a future connection destination of the wireless terminal 211 based on the estimated radio quality information. At that time, the radio quality estimating unit 330 does not output, to the interference control unit 350, the estimated radio quality information regarding a wireless base station that is determined as a wireless base station to be controlled by the interference control apparatus 1220. In this manner, the interference control may be performed based on only the estimated radio quality information items regarding the wireless terminals that are estimated as wireless terminals not controlled by the interference control apparatus 300.

The connection destination switching unit 1211 determines a future connection destination of the wireless terminal 211 based on the estimated radio quality information output from the radio quality estimating unit 330 and the base station information stored in the base station information storage unit 340. For example, the connection destination switching unit 1211 determines whether the wireless base station having the highest RSRP value in the radio quality information is a wireless base station to be controlled by the connection destination switching unit 1211 (that is, one of the wireless base stations 221 to 223) based on the base station information stored in the base station information storage unit 340.

Subsequently, the connection destination switching unit 1211 outputs the result of determination to the radio quality estimating unit 330. In addition, if the connection destination switching unit 1211 determines that a future connection destination of the wireless terminal 211 is a wireless base station to be controlled by the interference control apparatus 1220, the connection destination switching unit 1211 sends, to the interference control apparatus 1220, the estimated radio quality information output from the radio quality estimating unit 330 as the radio quality information. Furthermore, the connection destination switching unit 1211 sends the radio quality information via the external interface 1201.

The radio quality information receiving unit 310 receives the radio quality information sent from the connection destination switching unit 1211 of the interference control apparatus 1220 via the external interface 301 in addition to the radio quality information items sent from the wireless base stations 221 to 223.

Figure 13:
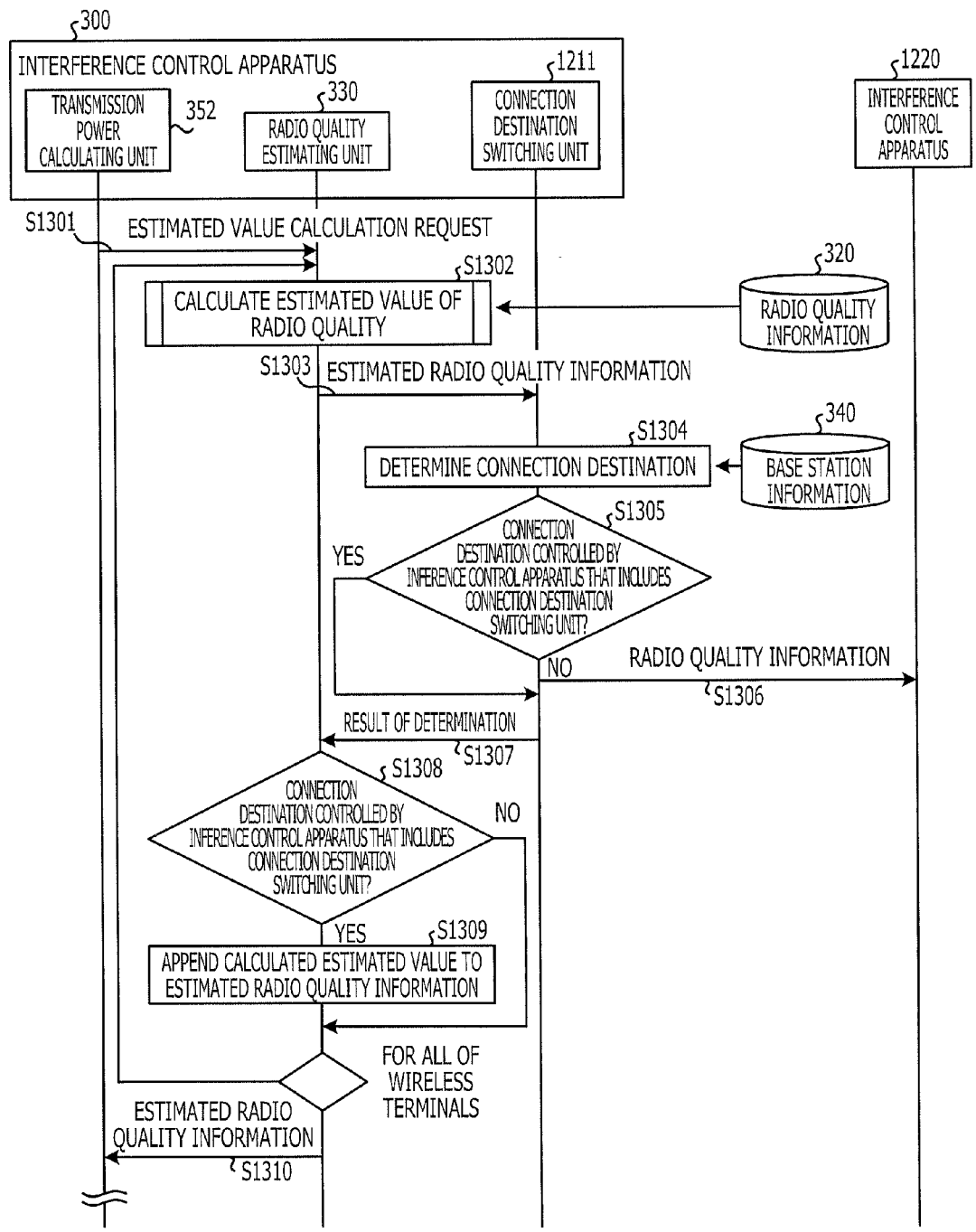
FIG. 13 is a sequence diagram illustrating an example of the processing performed by the interference control apparatus according to the fourth exemplary embodiment.

Processing Performed by Interference Control Apparatus According to Fourth Exemplary Embodiment FIG. 13 is a sequence diagram illustrating an example of the processing performed by the interference control apparatus according to the fourth exemplary embodiment. In step S502 illustrated in FIG. 5, the transmission power calculating unit 352, the radio quality estimating unit 330, and the connection destination switching unit 1211 perform, for example, the processes illustrated in FIG. 13. The transmission power calculating unit 352 sends a request for calculation of the estimated value of the radio quality to the radio quality estimating unit 330 first (step S1301).

Subsequently, the radio quality estimating unit 330 calculates the estimated value of the radio quality of the target wireless terminal based on the radio quality information stored in the radio quality information storage unit 320 (step S1302). The calculation process of the estimated value of the radio quality performed in step S1302 is the same as, for example, that illustrated in FIG. 7.

Subsequently, the radio quality estimating unit 330 outputs the estimated radio quality information indicating the estimated values calculated in step S1302 to the connection destination switching unit 1211 (step S1303). Thereafter, the connection destination switching unit 1211 determines a future connection destination of the wireless terminal corresponding to the estimated radio quality information from the radio quality estimating unit 330 based on the estimated radio quality information received from the radio quality estimating unit 330 and the base station information stored in the base station information storage unit 340 (step S1304).

Subsequently, the connection destination switching unit 1211 determines whether the future connection destination of the wireless terminal corresponding to the estimated radio quality information received from the radio quality estimating unit 330 is controlled by the inference control apparatus that includes the connection destination switching unit 1211 (that is, the interference control apparatus 300) based on the result of determination made in step S1304 (step S1305). If the future connection destination of the wireless terminal is controlled by the inference control apparatus that includes the connection destination switching unit 1211 (Yes in step S1305), the processing performed by the connection destination switching unit 1211 proceeds to step S1307.

However, if, in step S1305, the future connection destination of the wireless terminal is controlled by the interference control apparatus 1220 (No in step S1305), the processing performed by the connection destination switching unit 1211 proceeds to step S1306. That is, the connection destination switching unit 1211 sends the estimated radio quality information received from the radio quality estimating unit 330 to the interference control apparatus 1220 as the radio quality information (step S1306).

Subsequently, the connection destination switching unit 1211 outputs the result of determination made in step S1304 to the radio quality estimating unit 330 (step S1307). Thereafter, the radio quality estimating unit 330 determines whether the future connection destination of the wireless terminal corresponding to the radio quality information is controlled by the interference control apparatus that includes the connection destination switching unit 1211 based on the result of determination output in step S1307 (step S1308).

If, in step S1308, the future connection destination of the wireless terminal is not controlled by the interference control apparatus that includes the connection destination switching unit 1211 (No in step S1308), the radio quality estimating unit 330 does not perform the process in step S1309. However, if the future connection destination of the wireless terminal is controlled by the interference control apparatus that includes the connection destination switching unit 1211 (Yes in step S1308), the radio quality estimating unit 330 appends the estimated value calculated in step S1302 to the estimated radio quality information to be output to the transmission power calculating unit 352 (step S1309).

Subsequently, the processing performed by the radio quality estimating unit 330 returns to step S1302 unless the processes in steps S1302 to S1309 are performed for all of the wireless terminals currently connected to the wireless base stations 221 to 223. If the processes in steps S1302 to S1309 have been performed for all of the wireless terminals currently connected to the wireless base stations 221 to 223, the radio quality estimating unit 330 outputs, to the transmission power calculating unit 352, the estimated radio quality information having the estimated value appended thereto in step S1309 (step S1310).

Subsequently, the transmission power calculating unit 352 performs the processes in steps S604 to S611 illustrated in FIG. 6 and, thereafter, the series of calculation processes are completed. As described above, the interference control apparatus 300 identifies a wireless terminal that moves into the cell of the wireless base station under the control of the interference control apparatus 1220 using future radio quality information estimated from the radio quality information. Thereafter, the interference control apparatus 300 sends the radio quality information to the interference control apparatus 1220. In this manner, even when the wireless terminal 211 moves from area to area controlled by the interference control apparatus 300, the transmission power levels of the wireless base stations may be changed so that an optimum communication environment is provided by the destination interference control apparatus 1220.

Figure 14:
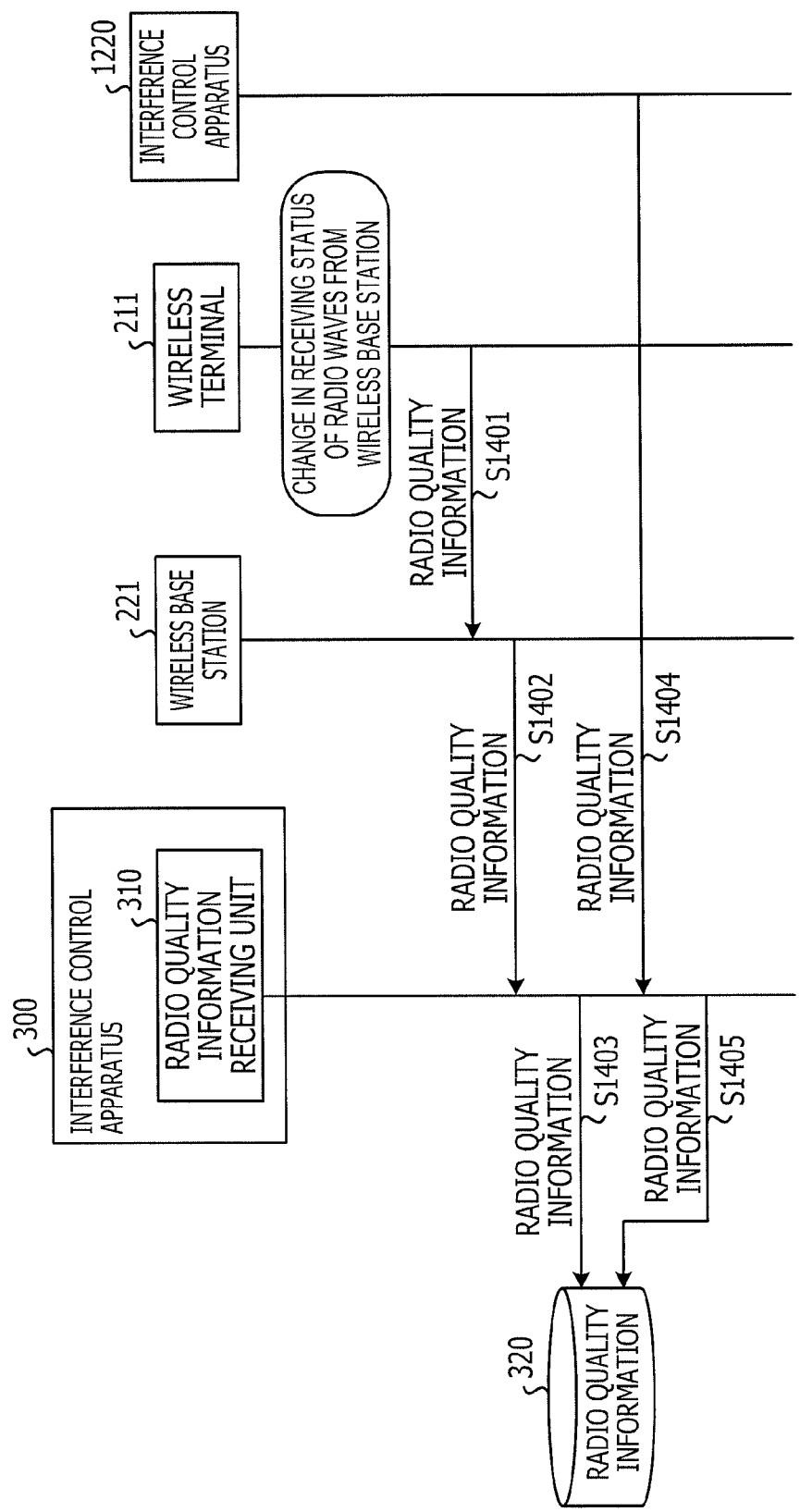
FIG. 14 is a sequence diagram illustrating an example of the processing performed by a communication system according to the fourth exemplary embodiment.

Processing Performed by Communication System According to Fourth Exemplary Embodiment FIG. 14 is a sequence diagram illustrating an example of the processing performed by a communication system according to the fourth exemplary embodiment. If the receiving status of the radio waves received from the wireless base station 221 with which the wireless base station 221 is currently connected is changed, the wireless terminal 211 sends new radio quality information to the wireless base station 221 (step S1401).

Subsequently, the wireless base station 221 sends, to the interference control apparatus 300, the radio quality information sent in step S1401 (step S1402). The process in step S1402 may be performed asynchronously with the process in step S1401 (for example, periodically). Thereafter, the radio quality information receiving unit 310 of the interference control apparatus 300 stores the radio quality information sent in step S1402 in the radio quality information storage unit 320 (step S1403).

In addition, for example, in the interference control apparatus 1220, the process that is the same as the process performed by the interference control apparatus 300 in FIG. 13 is performed, and the radio quality information is sent to the interference control apparatus 300 in step S1306 illustrated in FIG. 13 (step S1404). Thereafter, the radio quality information receiving unit 310 of the interference control apparatus 300 stores the radio quality information sent in step S1404 in the radio quality information storage unit 320 (step S1405).

In this manner, the radio quality information receiving unit 310 receives the radio quality information item sent from the interference control apparatus 1220 in addition to the radio quality information items sent from the wireless base stations 221 to 223 and stores the received radio quality information items in the radio quality information storage unit 320.

Figure 15A:
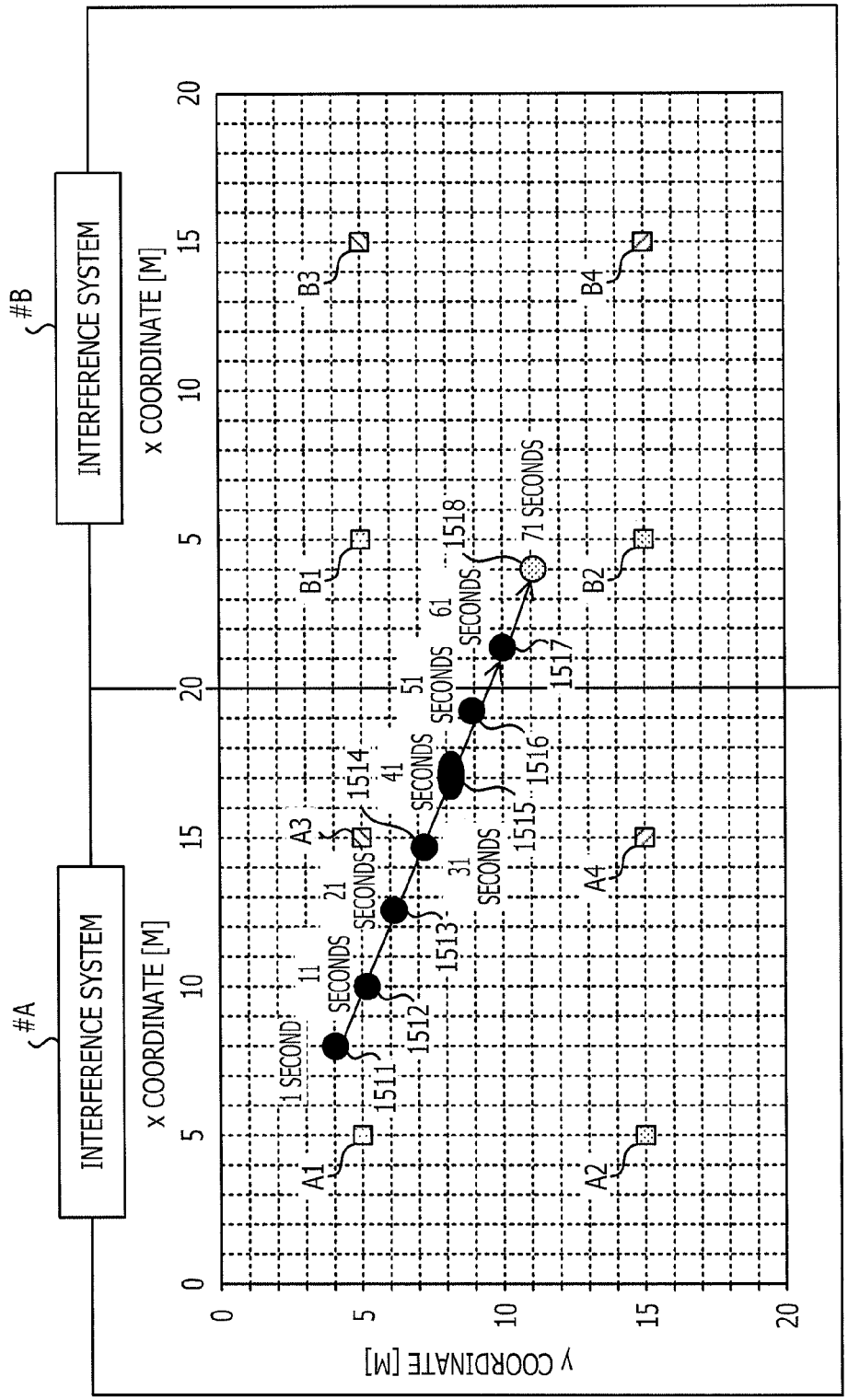
FIG. 15A illustrates an example of the positions of wireless base stations and a wireless terminal according to the fourth exemplary embodiment.

Positions of Wireless Base Stations and Wireless Terminal According to Fourth Exemplary Embodiment FIG. 15A illustrates an example of the positions of the wireless base stations and the wireless terminal according to the fourth exemplary embodiment. In FIG. 15A, the same numbering is used for the elements as is utilized in FIG. 8A, and descriptions of the elements are not repeated. In this example, an interference system #B including the wireless base stations B1 to B4 is adjacent to an interference system #A including the wireless base stations A1 to A4 illustrated in FIG. 8A, and the wireless terminal 211 moves from the interference system #A into the interference system #B.

The wireless base stations B1 to B4 are controlled by the interference control apparatus 1220. Positions 1511 to 1518 are the positions of the wireless terminal 211 at the points in time that are 1 second, 11 seconds, 21 seconds, 31 seconds, 41 seconds, 51 seconds, 61 seconds, and 71 seconds from a predetermined point in time, respectively. Note that, for example, the current time is a time that is 65 seconds from the predetermined point in time and, thus, the position 1518 at a time that is 71 seconds from the predetermined point in time is a future position.

Radio Quality Information Table According to Fourth Exemplary Embodiment

FIG. 15B illustrates an example of a radio quality information table according to the fourth exemplary embodiment. In FIG. 15B, the same numbering is used for the elements as is utilized in FIG. 8B, and descriptions of the elements are not repeated. In the case illustrated in FIG. 15A, the radio quality information storage unit 320 stores, for example, a radio quality information table 1521 illustrated in FIG. 15B. As illustrated in FIG. 15B, the radio quality information table 1521 contains the base station information regarding the wireless base stations B1 to B4 controlled by the interference control apparatus 1220 in addition to the base station information regarding the wireless base stations A1 to A4 controlled by the interference control apparatus 300.

Estimated radio quality information 1522 indicates the estimated values of the radio quality at time "71". For example, at time "61", the connection destination switching unit 1211 selects the wireless base station B1 having the highest estimated value of the radio quality at time "71" as a cell to connect to. In such a case, since the connection destination is a wireless base station controlled by the interference control apparatus 1220, the connection destination switching unit 1211 sends the estimated radio quality information 1522 to the interference control apparatus 1220 as the radio quality information.

Note that in such a case, instead of sending the radio quality information regarding all the cells, the connection destination switching unit 1211 may extract only practically effective values and send the values. In addition, since the connection destination is a wireless base station controlled by the interference control apparatus 1220, the connection destination switching unit 1211 does not output the estimated radio quality information 1522 to the interference control unit 350.

As described above, according to the fourth exemplary embodiment, the interference control apparatus 300 may control the transmission power levels using the estimated value of the radio quality of the wireless terminal 211 that is estimated to be connected to any one of the wireless base stations 221 to 223 in the future. In this manner, interference may be reduced.

Fifth Exemplary Embodiment

The differences of a fifth exemplary embodiment from the second exemplary embodiment are described below.

Interference Control Apparatus According to Fifth Exemplary Embodiment

Figure 16A:
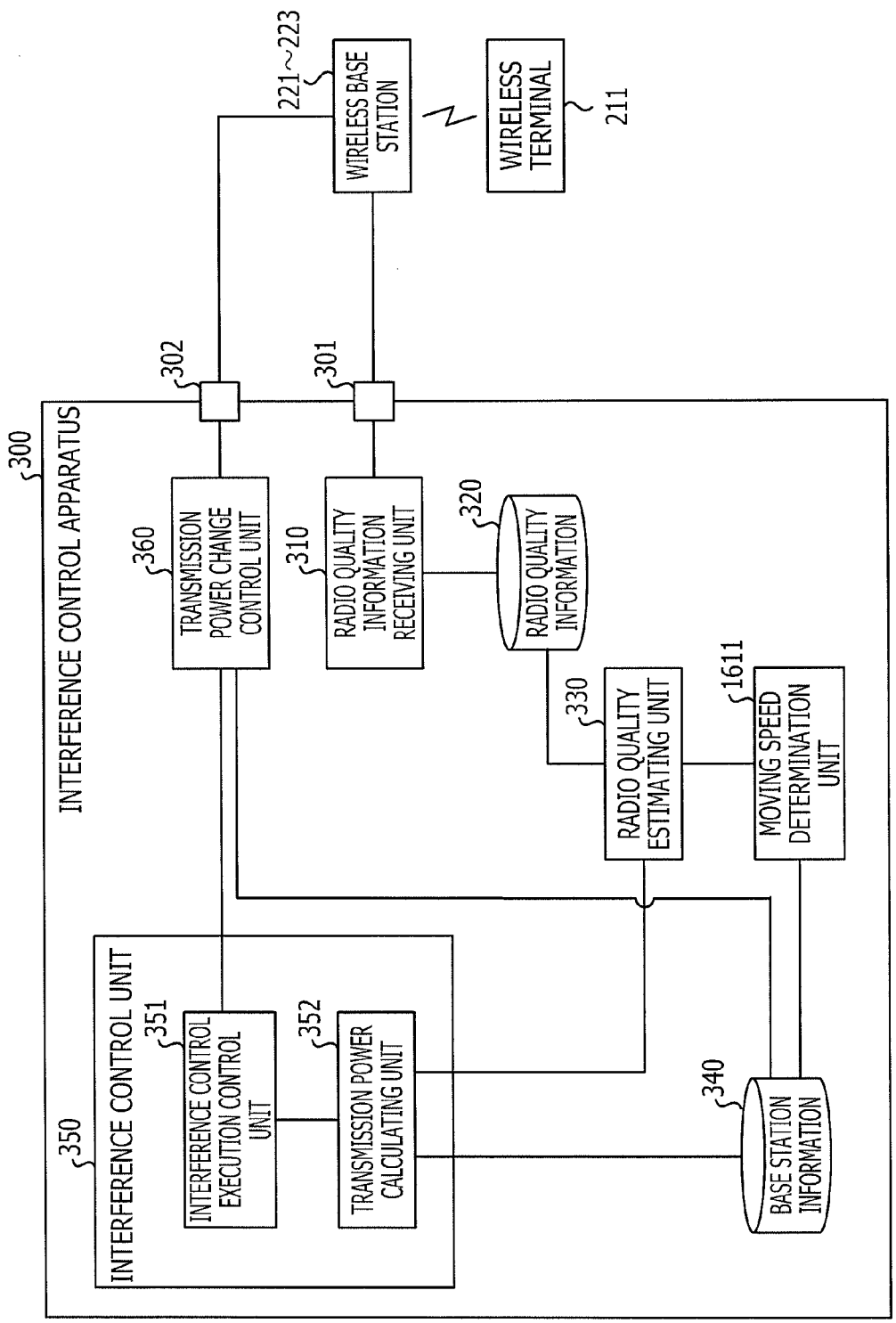
FIG. 16A illustrates an example of an interference control apparatus according to a fifth exemplary embodiment.

FIG. 16A illustrates an example of an interference control apparatus according to the fifth exemplary embodiment. FIG. 16B illustrates an example of the flow of signals in the interference control apparatus illustrated in FIG. 16A. In FIGS. 16A and 16B, the same numbering is used for the elements as is utilized in FIGS. 3A and 3B, and descriptions of the elements are not repeated. As illustrated in FIGS. 16A and 16B, an interference control apparatus 300 according to the fifth exemplary embodiment includes a moving speed determination unit 1611 in addition to the configuration illustrated in FIGS. 3A and 3B.

By outputting the radio quality information regarding the wireless terminal 211 to the moving speed determination unit 1611, the radio quality estimating unit 330 requests the moving speed determination unit 1611 to determine whether the wireless terminal 211 is moving at high speed. The moving speed determination unit 1611 determines whether the wireless terminal 211 is moving at high speed based on the radio quality information output from the radio quality estimating unit 330 and outputs the result of determination to the radio quality estimating unit 330.

Processing Performed by Interference Control Apparatus According to Fifth Exemplary Embodiment FIG. 17 is a sequence diagram illustrating an example of the processing performed by the interference control apparatus according to the fifth exemplary embodiment. In step S502 illustrated in FIG. 5, the transmission power calculating unit 352, the radio quality estimating unit 330, and the moving speed determination unit 1611 perform, for example, the processes in the steps illustrated in FIG. 17. The transmission power calculating unit 352 sends a request for calculation of the estimated value of the radio quality to the radio quality estimating unit 330 first (step S1701).

Subsequently, the radio quality estimating unit 330 outputs, to the moving speed determination unit 1611, the latest two radio quality information items regarding the target wireless terminal among the radio quality information items stored in the radio quality information storage unit 320 (step S1702). Thereafter, the moving speed determination unit 1611 determines whether duplicated wireless base stations (duplicated reception cells) are present in the two radio quality information items output in step S1702 (step S1703). If duplicated wireless base stations are not present (No in step S1703), the moving speed determination unit 1611 determines that the wireless terminal 211 is moving at high speed (step S1704) and, thus, the processing proceeds to step S1707.

However, if, in step S1703, duplicated wireless base stations are present (Yes in step S1703), the moving speed determination unit 1611 determines whether the difference between the highest RSRPs in the two radio quality information items is greater than or equal to 10 [dB] (step S1705). If the difference is greater than or equal to 10 [dB] (Yes in step S1705), the processing performed by the moving speed determination unit 1611 proceeds to step S1704, where it is determined that the wireless terminal 211 is moving at high speed.

However, if, in step S1705, the difference is less than 10 [dB] (No in step S1705), the moving speed determination unit 1611 determines that the wireless terminal 211 is moving at non-high speed (step S1706). Thereafter, the moving speed determination unit 1611 outputs, to the radio quality estimating unit 330, the result of determination as to whether the wireless terminal 211 is moving at high speed or non-high speed (step S1707).

Subsequently, the radio quality estimating unit 330 determines whether the wireless terminal 211 is moving at high speed or non-high speed based on the result of determination output in step S1707 (step S1708). If the wireless terminal 211 is moving at high speed (Yes in step S1708), the radio quality estimating unit 330 does not perform the process in step S1709. However, if the wireless terminal 211 is moving at non-high speed (No in step S1708), the radio quality estimating unit 330 calculates the estimated value of the radio quality of the target wireless terminal (step S1709). The calculation of the estimated value of the radio quality performed in step S1709 is the same as, for example, that illustrated in FIG. 7.

Subsequently, the processing performed by the radio quality estimating unit 330 returns to step S1702 unless the processes in steps S1702 to S1709 are performed for all of the wireless terminals currently connected to the wireless base stations 221 to 223. If the processes in steps S1702 to S1709 are performed for all of the wireless terminals currently connected to the wireless base stations 221 to 223, the radio quality estimating unit 330 outputs, to the transmission power calculating unit 352, the estimated radio quality information indicating the estimated values calculated in step S1709 (step S1710).

Thereafter, the transmission power calculating unit 352 performs, for example, the processes in steps S604 to S611 illustrated in FIG. 6 and, thereafter, the series of calculation processes is completed. As described above, even when power control is performed based on the radio quality information regarding the wireless terminal 211, it is highly likely that the transmission power levels are not optimum for the wireless terminal 211 if it is determined that the wireless terminal 211 is currently moving at high speed. Accordingly, the interference control is performed by removing the radio quality information regarding the wireless terminal 211. In this manner, interference occurring in the wireless terminal 211 that is moving at non-high speed may be reduced. In addition, fluctuation of the interference control caused by high-speed movement of the wireless terminal 211 may be reduced and, thus, the interference control may be stabilized.

As described above, according to the interference control apparatus 300 of the fifth exemplary embodiment, the transmission power levels may be controlled using the estimated values of the radio quality in the wireless terminal 211 that is estimated not to move at high speed (under a particular moving condition). Accordingly, interference occurring in the wireless terminal 211 that does not move at high speed may be reduced. In addition, fluctuation of the interference control caused by high-speed movement of the wireless terminal 211 may be reduced and, thus, the interference control may be stabilized.

Sixth Exemplary Embodiment

The differences of a sixth exemplary embodiment from the second exemplary embodiment are described below.

Interference Control Apparatus According to Sixth Exemplary Embodiment

Figure 18A:
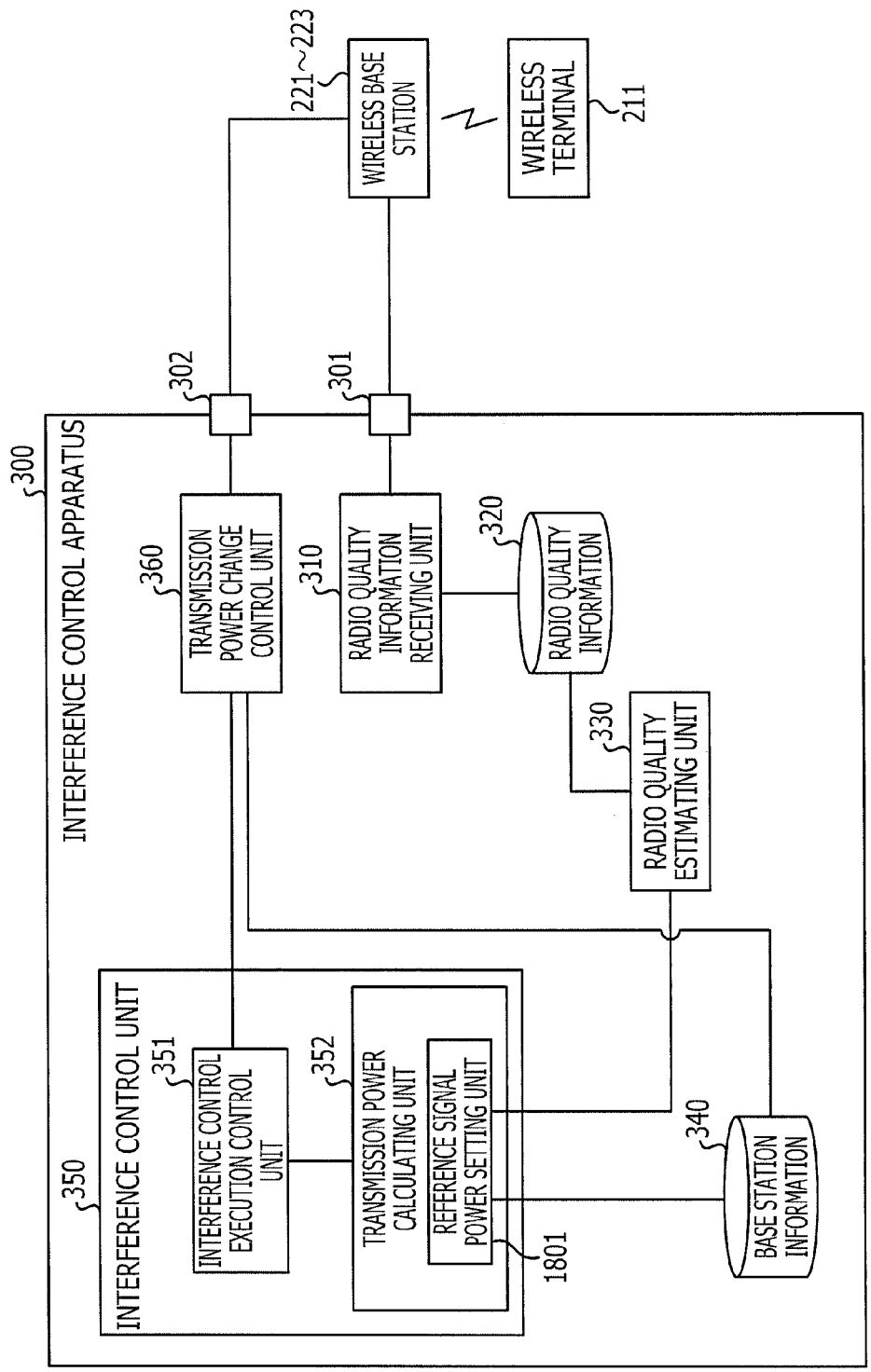
FIG. 18A illustrates an example of an interference control apparatus according to a sixth exemplary embodiment.
Figure 18B:
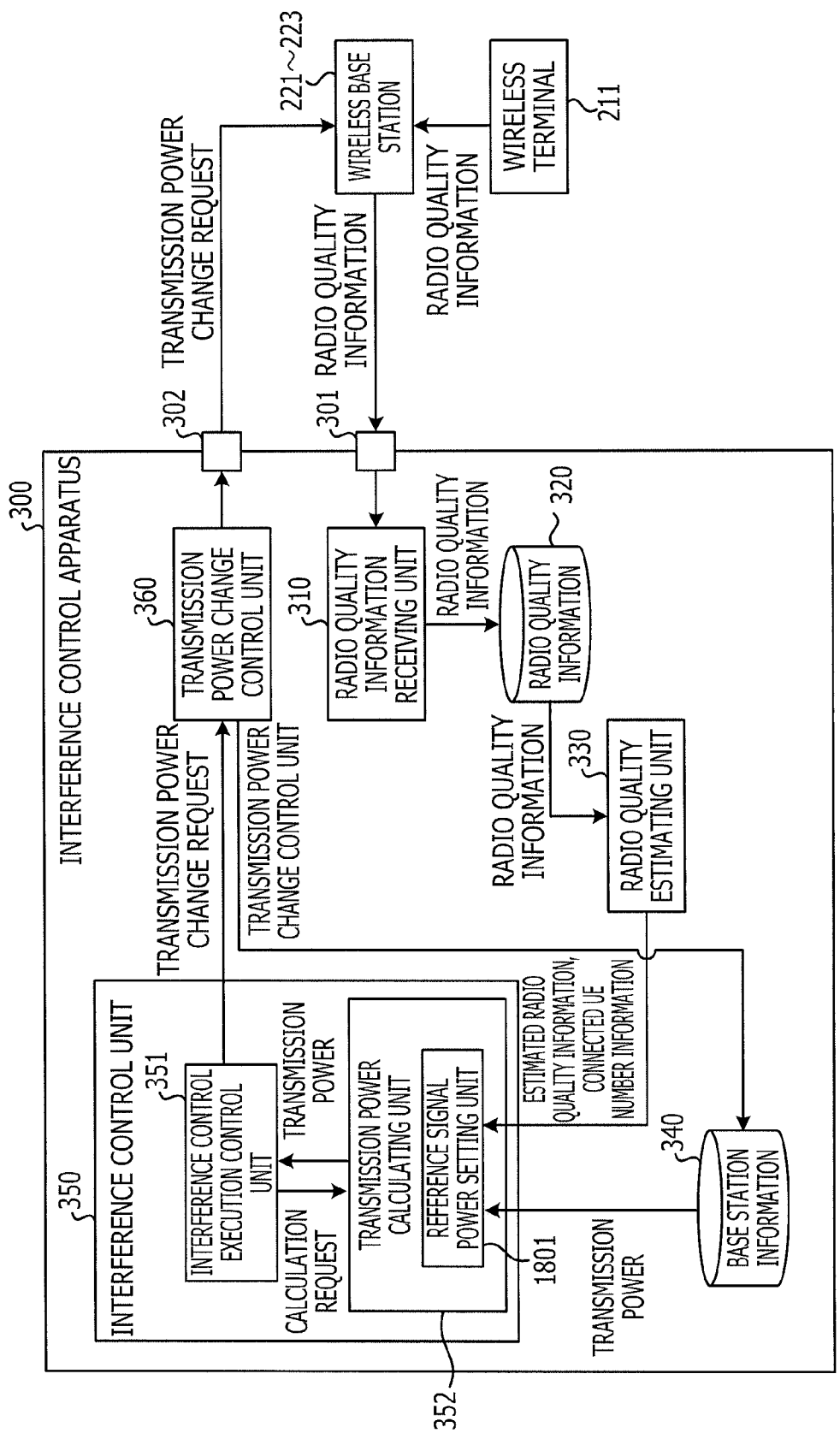
FIG. 18B illustrates an example of the flow of signals in the interference control apparatus illustrated in FIG. 18A.

FIG. 18A illustrates an example of an interference control apparatus according to a sixth exemplary embodiment. FIG. 18B illustrates an example of the flow of signals in the interference control apparatus illustrated in FIG. 18A. In FIGS. 18A and 18B, the same numbering is used for the elements as is utilized in FIGS. 3A and 3B, and descriptions of the elements are not repeated. As illustrated in FIGS. 18A and 18B, a transmission power calculating unit 352 of an interference control apparatus 300 according to the sixth exemplary embodiment includes a reference signal power setting unit 1801.

The base station information storage unit 340 further stores the reference signal power for each of the wireless base stations 221 to 223. The reference signal power may be preset in accordance with, for example, installation conditions of the wireless base stations 221 to 223.

The radio quality estimating unit 330 outputs connected UE number information indicating the number of UEs connected to the wireless base stations 221 to 223 to the transmission power calculating unit 352. If the number of connected UEs indicated by the connected UE number information output from the radio quality estimating unit 330 is zero, the reference signal power setting unit 1801 of the transmission power calculating unit 352 sets the transmission power levels of the wireless base stations 221 to 223 to the reference signal powers stored in the base station information storage unit 340.

Calculation of Transmission Power Level According to Sixth Exemplary Embodiment

Figure 19:
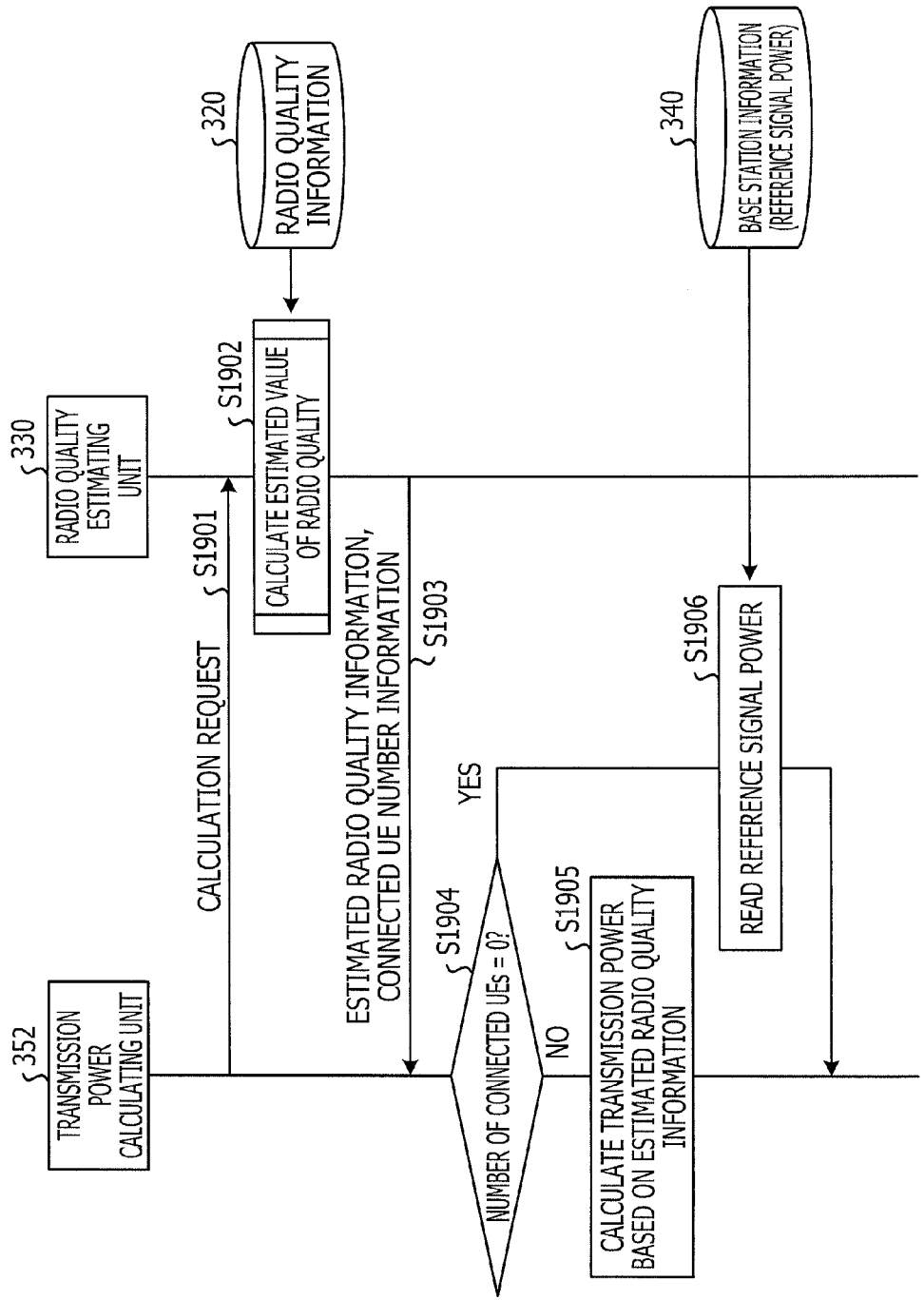
FIG. 19 is a sequence diagram illustrating an example of calculation of a transmission power level according to the sixth exemplary embodiment.

FIG. 19 is a sequence diagram illustrating an example of calculation of the transmission power level according to the sixth exemplary embodiment. In step S502 illustrated in FIG. 5, the transmission power calculating unit 352 and the radio quality estimating unit 330 perform, for example, the processes in steps illustrated in FIG. 19.

The transmission power calculating unit 352 sends a request for calculation of the estimated value of the radio quality to the radio quality estimating unit 330 first (step S1901). Thereafter, the radio quality estimating unit 330 calculates the estimated values of the radio quality for the wireless base stations 221 to 223 based on the radio quality information stored in the radio quality information storage unit 320 (step S1902). The calculation process of the estimated value of the radio quality performed in step S1902 is the same as, for example, that illustrated in FIG. 7.

Subsequently, the radio quality estimating unit 330 outputs, to the transmission power calculating unit 352, the estimated radio quality information indicating the estimated values calculated in step S1902 and the connected UE number information indicating the number of UEs connected to the wireless base stations 221 to 223 (step S1903).

Subsequently, the transmission power calculating unit 352 determines whether the number of connected UEs indicated by the connected UE number information output in step S1903 is zero (step S1904). If the number of connected UEs indicated by the output connected UE number information is not zero (No in step S1904), the transmission power calculating unit 352 calculates the transmission power levels based on the estimated radio quality information output in step S1903 (step S1905) and, thereafter, the series of processes is completed. The process performed in step S1905 is the same as, for example, the processes performed in steps S604 to S611 illustrated in FIG. 6.

However, if, in step S1904, the number of connected UEs indicated by the output connected UE number information is zero (Yes in step S1904), the transmission power calculating unit 352 reads the reference signal power out of the base station information storage unit 340 using the reference signal power setting unit 1801 (step S1906). Thereafter, the transmission power calculating unit 352 returns the reference signal powers read in step S1906 as the transmission power levels of the wireless base stations 221 to 223. Thereafter, the series of calculation processes is completed.

As described above, according to the interference control apparatus 300 of the sixth exemplary embodiment, if the wireless terminal 211 is not connected to any one of the wireless base stations 221 to 223, the transmission power levels of the wireless base stations 221 to 223 may be initialized. In this manner, the balance among the transmission power levels of the wireless base stations 221 to 223 may be reset and, thus, the interference control may be stabilized.

Seventh Exemplary Embodiment

The differences of a seventh exemplary embodiment from the fourth exemplary embodiment are described below.

Interference Control Apparatus According to Seventh Exemplary Embodiment

FIG. 20A illustrates an example of an interference control apparatus according to a seventh exemplary embodiment.

Figure 20B:
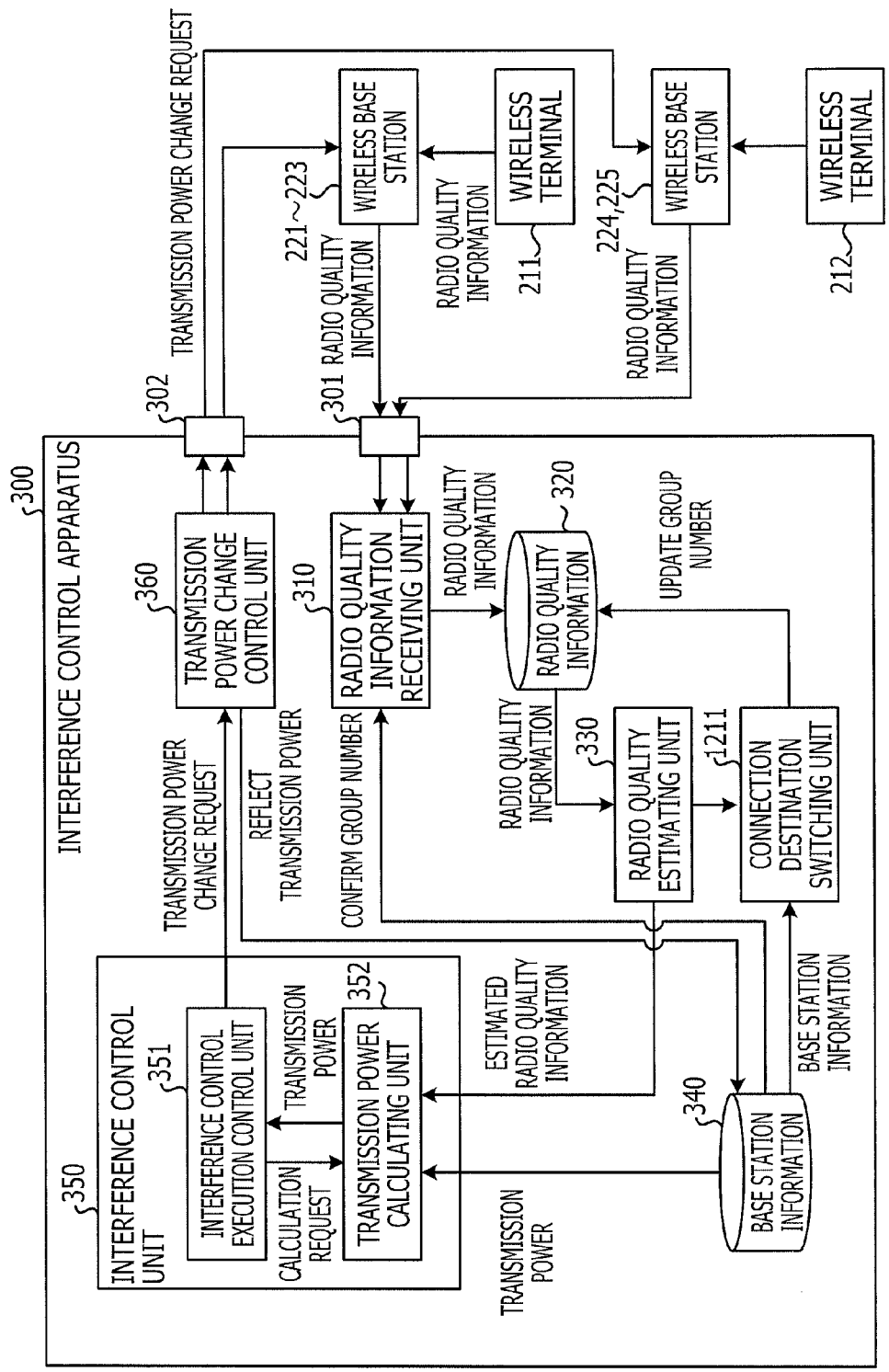
FIG. 20B illustrates an example of the flow of signals in the interference control apparatus illustrated in FIG. 20A.

FIG. 20B illustrates an example of the flow of signals in the interference control apparatus illustrated in FIG. 20A. In FIGS. 20A and 20B, the same numbering is used for the elements as is utilized in FIGS. 3A and 3B or FIGS. 12A and 12B, and descriptions of the elements are not repeated. As illustrated in FIGS. 20A and 20B, an interference control apparatus 300 according to the seventh exemplary embodiment includes a connection destination switching unit 1211 in addition to the configuration illustrated in FIGS. 3A and 3B.

According to the seventh exemplary embodiment, the interference control apparatus 300 performs interference control for each of a group G1 including the wireless base stations 221 to 223 and a group G2 including a plurality of wireless base stations other than the wireless base stations 221 to 223. That is, the interference control apparatus 300 according to the seventh exemplary embodiment further includes the function of the interference control apparatus 1220 illustrated in FIGS. 12A and 12B. In this example, the group G2 includes the wireless base stations 224 and 225.

The base station information storage unit 340 stores, as a target of the interference control performed by the interference control apparatus 300, the base station information regarding the wireless base stations 224 and 225 in addition to the base station information regarding the wireless base stations 221 to 223 (refer to, for example, FIG. 15B). In addition, the base station information storage unit 340 stores a group number of each of the wireless base stations.

The radio quality information receiving unit 310 receives, via the external interface 301, the radio quality information items sent from the wireless base stations 224 and 225 in addition to the radio quality information items sent from the wireless base stations 221 to 223. In addition, the radio quality information receiving unit 310 appends a group number to the received radio quality information item based on the group number of each of the wireless base stations stored in the base station information storage unit 340 and stores the radio quality information item in the radio quality information storage unit 320.

The transmission power calculating unit 352 is designed to operate for each of the groups upon receiving a calculation request. For example, the transmission power calculating unit 352 performs a series of transmission power calculation processes for the group G1 first. Thus, the transmission power change for the wireless base stations 221 to 223 is performed based on the calculated transmission power levels. Subsequently, the transmission power calculating unit 352 performs a series of transmission power calculation processes for the group G2 Thus, the transmission power switching for the wireless base stations 224 and 225 is performed based on the calculated transmission power levels.

Like the fourth exemplary embodiment, the connection destination switching unit 1211 detects movement of the wireless base station 221 from a group to another group based on the base station information in the base station information storage unit 340. Thereafter, if the connection destination switching unit 1211 determines that movement of the wireless base station 221 from a group to another group is detected, the radio quality information receiving unit 310 updates the group number and stores the radio quality information.

Figure 21:
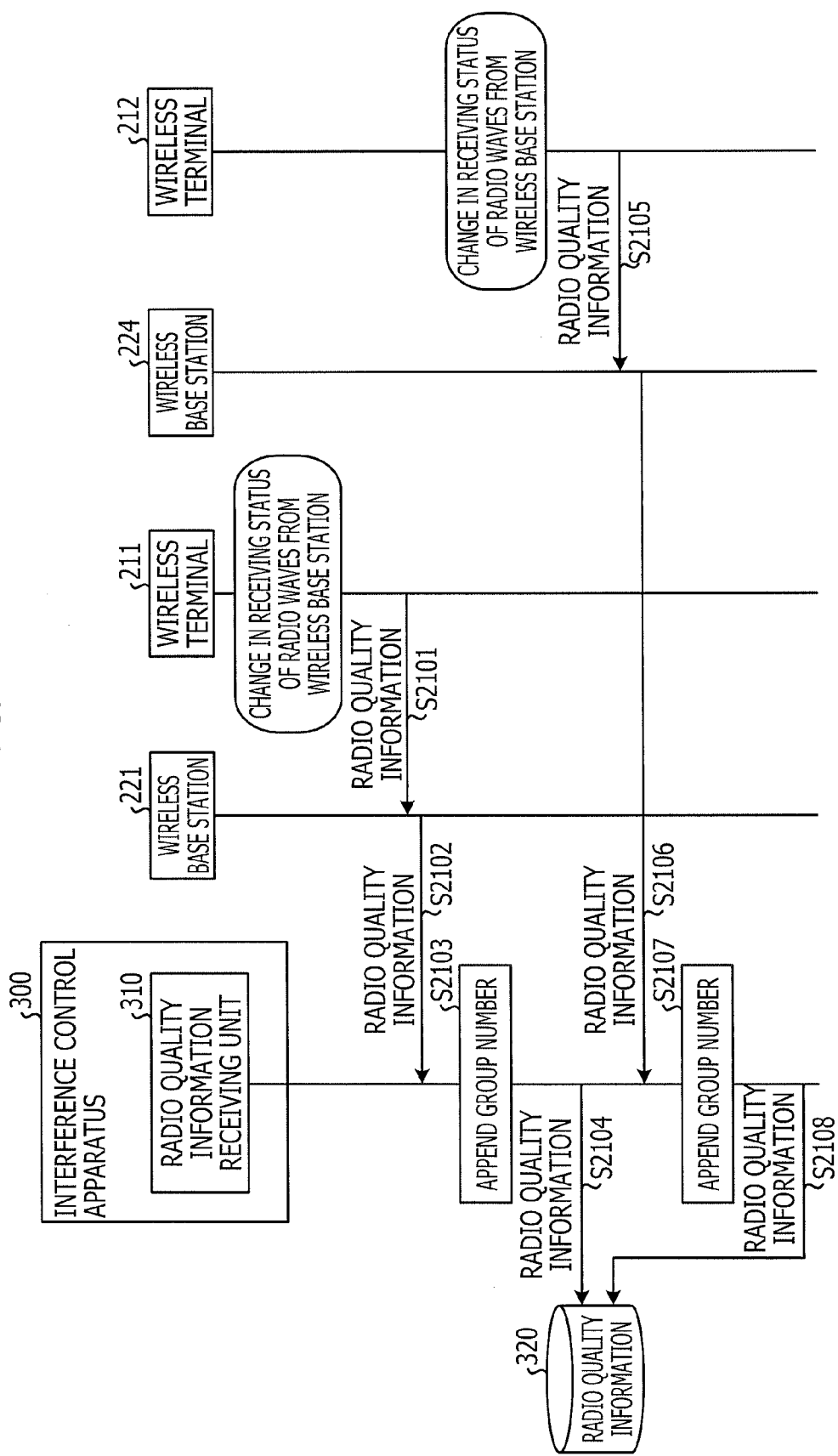
FIG. 21 is a sequence diagram illustrating an example of the processing performed by a communication system according to the seventh exemplary embodiment.

Processing Performed by Communication System According to Seventh Exemplary Embodiment FIG. 21 is a sequence diagram illustrating an example of the processing performed by a communication system according to the seventh exemplary embodiment. If a change in the receiving status of radio waves received from the wireless base station 221 to which the wireless terminal 211 is currently connected is detected, the wireless terminal 211 sends new radio quality information to the wireless base station 221 (step S2101). Thereafter, the wireless base station 221 sends the radio quality information sent in step S2101 to the interference control apparatus 300 (step S2102). The process in step S2102 may be performed asynchronously with the process of step S2101 (for example, periodically).

Subsequently, the radio quality information receiving unit 310 of the interference control apparatus 300 appends a group number to the radio quality information sent in step S2102 based on the group number for each of the wireless base stations stored in the base station information storage unit 340 (step S2103). Thereafter, the radio quality information receiving unit 310 stores the radio quality information having the group number appended thereto in step S2103 in the radio quality information storage unit 320 (step S2104).

In addition, if the receiving status of the radio waves received from the wireless base station 224 to which the wireless terminal 212 is currently connected is changed, the wireless terminal 212 sends new radio quality information to the wireless base station 224 (step S2105). Thereafter, the wireless base station 224 sends the radio quality information sent in step S2105 to the interference control apparatus 300 (step S2106). The process in step S2106 may be performed asynchronously with the process of step S2105 (for example, periodically).

Subsequently, the radio quality information receiving unit 310 of the interference control apparatus 300 appends a group number to the radio quality information sent in step S2106 based on the group number for each of the wireless base stations stored in the base station information storage unit 340 (step S2107). Thereafter, the radio quality information receiving unit 310 stores the radio quality information having the group number appended thereto in step S2107 in the radio quality information storage unit 320 (step S2108).

In this manner, the radio quality information receiving unit 310 appends a group number to the received radio quality information and stores the radio quality information in the radio quality information storage unit 320.

Figure 22:
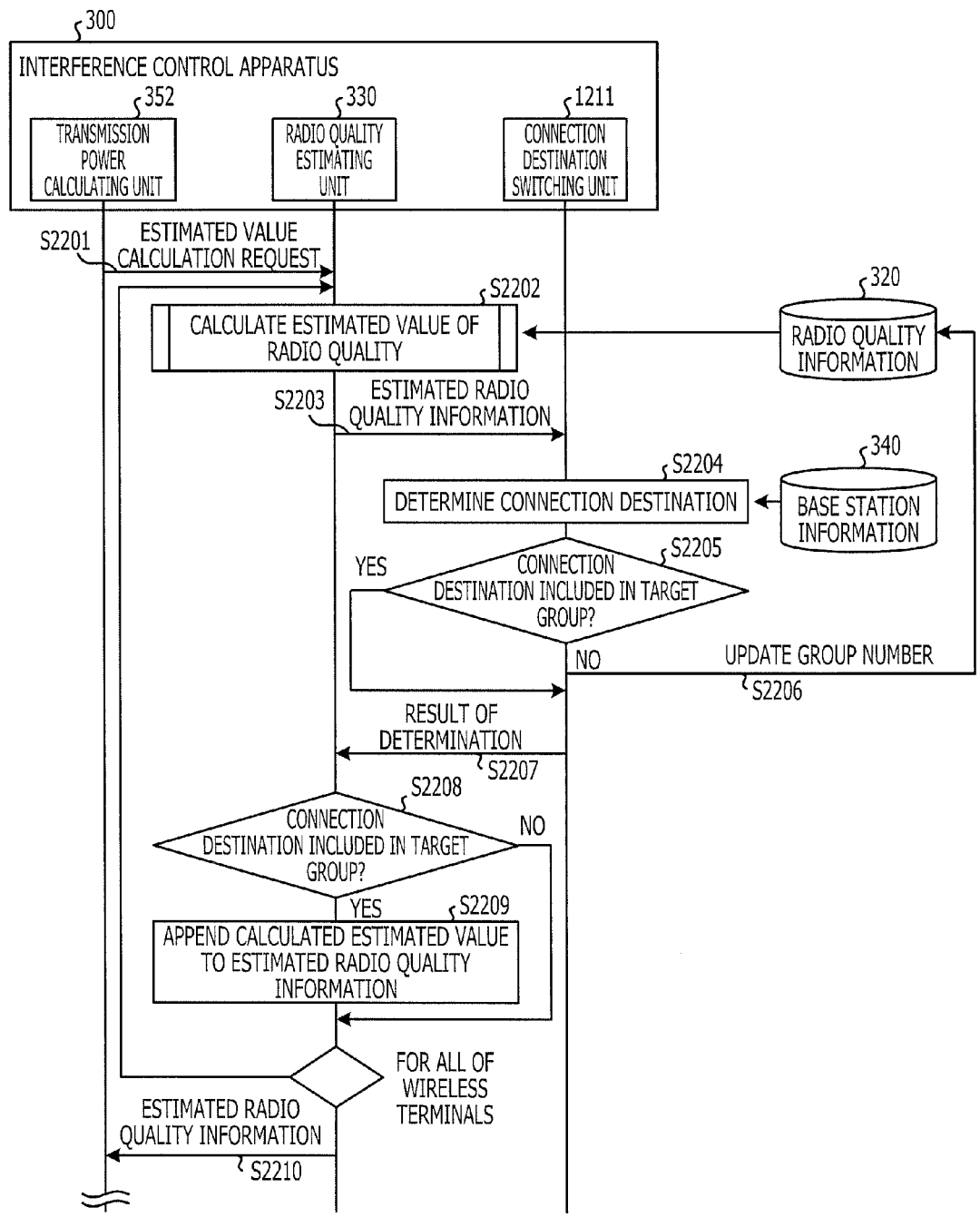
FIG. 22 is a sequence diagram illustrating an example of the processing performed by the interference control apparatus according to the seventh exemplary embodiment.

Processing Performed by Interference Control Apparatus According to Seventh Exemplary Embodiment FIG. 22 is a sequence diagram illustrating an example of the processing performed by the interference control apparatus according to the seventh exemplary embodiment. In step S502 illustrated in FIG. 5, the transmission power calculating unit 352, the radio quality estimating unit 330, and the connection destination switching unit 1211 perform, for example, the steps illustrated in FIG. 22 for each of the groups to be controlled. The processes in steps S2201 to S2210 illustrated in FIG. 22 are similar to those in steps S1301 to S1310 illustrated in FIG. 13, respectively.

Note that in step S2205, the connection destination switching unit 1211 determines whether a future connection destination of the wireless terminal corresponding to the estimated radio quality information is included in the current target group (step S2205). If a future connection destination of the wireless terminal is included in the current target group (Yes in step S2205), the processing performed by the connection destination switching unit 1211 proceeds to step S2207.

However, if, in step S2205, a future connection destination of the wireless terminal is not included in the current target group (No in step S2205), the processing performed by the connection destination switching unit 1211 proceeds to step S2206. That is, the connection destination switching unit 1211 updates the group number of the radio quality information regarding the wireless terminal corresponding to the estimated radio quality information item among the radio quality information items stored in the radio quality information storage unit 320 into the group number of the destination determined in step S2204 (step S2206).

In addition, in step S2208, the radio quality estimating unit 330 determines whether a future connection destination of the wireless terminal corresponding to the radio quality information is included in the current target group (step S2208). If a future connection destination of the wireless terminal is not included in the current target group (No in step S2208), the radio quality estimating unit 330 does not perform the process in step S2209. However, if a future connection destination of the wireless terminal is included in the current target group (Yes in step S2208), the processing performed by the radio quality estimating unit 330 proceeds to step S2209. After the processes in steps S2201 to S2210 are performed, the transmission power calculating unit 352 performs, for example, the processes in steps S604 to S611 illustrated in FIG. 6. Thereafter, the series of the calculation processes is completed.

In this manner, the interference control apparatus 300 reduces the amount of calculation performed by the transmission power calculating unit 352 by grouping the base stations to be controlled by the interference control apparatus 300 and performing the interference control of the wireless base stations in the group. In addition, if it is estimated that the wireless terminal 211 moves into a different group, the interference control apparatus 300 sends this information to the radio quality information receiving unit 310 of the different group in the interference control apparatus 300 using the base station information. In this manner, the number of the wireless base stations controllable by the interference control apparatus 110 may be increased.

Thus, according to the seventh exemplary embodiment, the interference control apparatus 300 may provide the same advantage as in the fourth exemplary embodiment even when the interference control apparatus 300 has a function that is the same as the function of the interference control apparatus 1220 of the fourth exemplary embodiment.

As described above, the interference control method, the interference control apparatus, and the wireless communication system reduce interference.

Note that examples of parameters that define the service area (the cell) of a wireless base station include the height of an antenna, an irradiation direction, a tilt angle, an irradiation angle, and the transmission power level. Tuning of these parameters is referred to as "area design". Tuning is made using a technique, such as ray tracing, based on the similar parameters of wireless base stations in the vicinity, the locations of the wireless base stations in the vicinity, and geographic information of the wireless base stations in the vicinity. In addition, to examine an actually established service area, an operation to measure the status of radio waves is performed in the field. Furthermore, in the LTE standard, a technique for automatically changing the transmission power levels of adjacent cells using ICIC (Inter Cell Interference Coordination) is provided so that interference is reduced.

In recent years, communication traffic among wireless terminals has increased due to, for example, widespread use of smart phones. Thus, communication common carriers reduce the coverage area of each of the wireless base stations (cell coverage reduction). Cell coverage reduction reduces the number of wireless terminals connected to each of the wireless base stations. As a result, the effective throughput of the wireless terminal may be increased.

Cell coverage reduction increases the number of the wireless base stations to be installed. Accordingly, simplifying the procedure for building of service areas is expected. Unfortunately, although ICIC provides a technique for optimizing adjacent areas, ICIC does not provide a technique for optimizing the areas in a wide range. Accordingly, when a relatively small area is build using a plurality of wireless base stations, a centralized interference control apparatus that totally determines the optimum transmission power levels of the wireless base stations in the area based on the transmission power levels of the wireless base stations is used.

In the interference control, it takes time to calculate and change the transmission power levels of the wireless base stations. In addition, a wireless terminal is highly likely to move from a base station to another base station. Accordingly, when a change in the transmission power level to an optimum level is completed, the wireless terminal may be moved and, thus, the transmission power level may not be optimum any more. In addition, even when the operation to change the transmission power levels is performed at high speed, fluctuation of the transmission power level in which the transmission power level increases and decreases caused by frequent change operations occurs. Thus, the interference control becomes unstable.

In contrast, according to the interference control apparatuses of the above-described exemplary embodiments, the interference control may be performed using an estimated value of future radio quality information after a predetermined period of time elapses in consideration of a switching time of the transmission power level obtained from the past and current radio quality information items. In addition, to ensure the optimum radio quality, the estimated throughput may be calculated from the estimated degree of interference. Furthermore, the transmission power of a wireless base station may be controlled in consideration of the number of wireless terminals connected to one wireless base station.

Still furthermore, when a wireless terminal moves from a service area built by the wireless base stations controlled by one interference control apparatus to another service area, two interference control apparatuses may cooperate with each other using estimated radio quality information. Thus, the optimum radio quality information may be provided for the wireless terminal. Yet still furthermore, an interference control apparatus may perform interference control using the radio quality information regarding the service area controlled by the interference control apparatus and the radio quality information regarding a service area controlled by a different interference control apparatus.

In this manner, interference may be reduced when a wireless terminal moves and, thus, the receiving environment of the wireless terminal changes.

By the way, in this application, for example, "connected to" is able to be replaced with "coupled to". Moreover, for example, when an element is referred to as being "connected to" or "coupled to" another element, it can be not only directly but also indirectly connected or coupled to the other element (namely, intervening elements may be present). So do "connecting to", "coupling to", "connection to", "coupling to" and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An interference control method comprising:
   receiving actual reception qualities of wireless signals from base stations, the actual reception qualities being measured by a plurality of wireless terminals, each of the wireless signals corresponding to each of the plurality of wireless terminals;
   estimating future reception qualities after a specified period of time based on the actual reception qualities;
   estimating, for each of combinations of transmission powers of the base stations, corresponding interference based on the future reception qualities; and
   setting each of transmission powers of the base stations based on one of the combinations of transmission powers that is selected based on the corresponding interference,
   wherein when a speed of a first wireless terminal, included in the plurality of wireless terminals, is more than a threshold, the future reception qualities are estimated based on the actual reception qualities corresponding to the plurality of wireless terminals other than the first wireless terminal.

2. The interference control method according to claim 1, wherein
   the corresponding interference is estimated for each of the wireless terminals.

3. The interference control method according to claim 2, wherein when switching of a second wireless terminal included in the plurality of wireless terminals to other base stations is predicted, the future reception qualities are estimated based on the actual reception qualities of the plurality of wireless terminal other than the second wireless terminal.

4. The interference control method according to claim 3, wherein the switching is predicted based on other actual reception qualities of wireless signals sent from the other base stations.

5. The interference control method according to claim 3, further comprising
   receiving the other actual reception qualities of wireless signals that are measured by a wireless terminal, each of the wireless signals being sent from each of the other base stations.

6. The interference control method according to claim 1, wherein the actual reception qualities include reception powers.

7. The interference control method according to claim 1, wherein the specified period of time is determined based on a time required for setting each of transmission powers of the base stations.

8. The interference control method according to claim 1, wherein the one of the combinations of transmission powers is selected based on a corresponding throughput of the wireless terminal that is estimated based on the corresponding interference.

9. The interference control method according to claim 8, wherein the corresponding throughputs is estimated based on a number of wireless terminals that are served by the base stations.

10. The interference control method according to claim 1, further comprising
    initiating each of the transmission powers of the wireless base stations when no wireless terminal is coupled to the wireless base stations.

11. The interference control method according to claim 1, wherein the one of the combinations of transmission powers is selected so as to reduce the corresponding interference.

12. An interference control apparatus comprising:
    a memory; and
    a processor coupled to the memory and configured to
    receive actual reception qualities of wireless signals that are measured by a plurality of wireless terminals, each of the wireless signals being sent from each of base stations,
    estimate future reception qualities after a specified period of time based on the actual reception qualities,
    estimate, for each of combinations of transmission powers of the base stations, corresponding interference based on the future reception qualities, and
    set each of transmission powers of the base stations based on one of the combinations of transmission powers that is selected based on the corresponding interference,
    wherein when a speed of a first wireless terminal included in the plurality of wireless terminals is more than a threshold, the future reception qualities are estimated based on the actual reception qualities corresponding to the plurality of wireless terminals other than the first wireless terminal.

13. A wireless communication system comprising:
    a wireless terminal;
    base stations; and
    an interference control apparatus comprising a memory and a processor coupled to the memory, configured to:
    receive actual reception qualities of wireless signals that are measured by a plurality of wireless terminals, each of the wireless signals corresponding to each of the plurality of wireless terminals,
    estimate future reception qualities after a specified period of time based on the actual reception qualities,
    estimate, for each of combinations of transmission powers of the base stations, corresponding interference based on the future reception qualities, and
    set each of transmission powers of the base stations based on one of the combinations of transmission powers that is selected based on the corresponding interference,
    wherein when a speed of a first wireless terminal included in the plurality of wireless terminals is more than a threshold, the future reception qualities are estimated based on the actual reception qualities corresponding to the plurality of wireless terminals other than the first wireless terminal.

* * * * *